United States Patent [19]

Kuwahara et al.

[11] Patent Number: 5,703,968
[45] Date of Patent: Dec. 30, 1997

[54] METHOD AND APPARATUS FOR DETECTING INTERPOLATION LINE

[75] Inventors: Yasuhiro Kuwahara, Osaka; Haruo Yamashita, Ibaraki; Tsumoru Fukushima, Kyoto, all of Japan

[73] Assignee: Matsushita Electric Industrial Co., Ltd., Osaka-fu, Japan

[21] Appl. No.: 424,036

[22] Filed: Apr. 18, 1995

[30] Foreign Application Priority Data

Apr. 19, 1994 [JP] Japan .................................. 6-080736

[51] Int. Cl.[6] .................................................. G06K 9/38
[52] U.S. Cl. ........................ 382/269; 382/266; 348/448; 358/428
[58] Field of Search ................................ 382/269, 298, 382/299, 300, 289; 348/448, 452, 458; 395/125; 358/451, 525, 428, 458

[56] References Cited

U.S. PATENT DOCUMENTS 5,347,599  9/1994  Yamashita et al. .................. 348/448

*Primary Examiner*—Curtis Kuntz
*Assistant Examiner*—Brian L. Johnson
*Attorney, Agent, or Firm*—Panitch Schwarze Jacobs & Nadel, P.C.

[57] ABSTRACT

A level difference of an upper pixel on an upper scanning line placed over an attentional pixel and a lower pixel on a lower scanning line placed under the attentional pixel, a level difference of the upper pixel and a lower left pixel, a level difference of the upper pixel and a lower right pixel, and a level difference of the lower pixel and an upper left pixel and a level difference of the lower pixel and an upper right pixel are derived. These level differences are compared with each other, and a line having a smallest level difference is detected and an effective interpolation line information is generated. Moreover, the level difference of the upper pixel and lower pixel is compared with the level difference of the upper right pixel and lower left pixel, and a smaller is set as a first interpolation line. In a similar manner, a second interpolation line is derived, and an ultimate interpolation line is selected from the first interpolation line, the second interpolation line and a line connecting the upper pixel and lower pixel on the basis of the effective interpolation line information.

19 Claims, 27 Drawing Sheets

METHOD AND APPARATUS FOR DETECTING INTERPOLATION LINE

FIELD OF THE INVENTION AND RELATED ART STATEMENT

1. Field of the Invention

The present invention relates generally to a method and an apparatus for finding or detecting an ideal interpolation line, and more particularly to a method and an apparatus for finding or detecting an ideal interpolation line to generate pixels and to interpolate by using the generated pixels in interpolation operation by which a frame signal of one frame is produced from a field signal of one field for example, in the technical fields of image display and information processing in a television and video system, a printer and a copy machine which process tone images.

2. Description of the Related Art

Recently, importance of dot density converting technology is increasing with digitization of video apparatus. In IDTV (Improved definition television) and EDTV (Enhanced definition television), a non-interlace display is an important technology. In the case that correlation exists between successive frames such as a static image, the non-interlace display is attained by using the information of the previous frame. On the other hand, in the case that the correlation does not exist between the successive frames, the non-interlace display is attained by interpolating between successive scanning lines in one field. In a similar manner, a hard copy machine of a video signal such as a video printer comprises a print engine to record the number of pixels corresponding to one frame, and the entire data of the one frame are recorded when the video signal of a static image is inputted. When the video signal of a moving image is inputted, the number of pixels is converted to a number of pixels corresponding to one frame by interpolating information in one field, and the video signal of the converted moving image is recorded. As mentioned above, the interpolating operation for forming one frame from the information of one field is called "field interpolation".

Conventional field interpolation uses a method of linear interpolation wherein an average of luminance levels of pixels on an upper scanning line placed over a scanning line to be interpolated and pixels on a lower scanning line placed under the scanning line to be interpolated is derived. In this method, a resolution can not be enhanced because of the principle of interpolation which creates a large number of pixels from information of a small number of pixels. This method purposes to attain smoothness in the image by increasing the number of pixels. Therefore, an interpolated image is blurred in comparison with the image of one frame obtained without using the interpolation.

The above-mentioned disadvantage in the linear interpolation is inevitable because of the principle thereof. Then, an investigation is made on an interpolation method for realizing the smoothness of a diagonal line in the image and a vertical resolution which are better than the linear interpolation by using correlation detection utilizing a statistical characteristic in the image such as continuity.

A prior art of the interpolation method comprising the above-mentioned correlation detection is described in "PHOTOGRAPHIC INDUSTRY" SHASHINKOGYO PUBLISHING Co., LTD. October 1989, PP. 107–108. This prior art is described with reference to FIG. 24 hereafter.

FIG. 24 is a diagram representing the principle of the interpolation method utilizing the conventional correlation detection. Referring to FIG. 24, a line X and a line Z are horizontal scanning lines which are successively inputted in the same field, and a line Y represents a scanning line which is not inputted in this field. An attentional pixel A is on the line Y to be interpolated. The attentional pixel A is produced by using pixels B, C and D on the line X located over the line Y and pixels E, F and G on the line Z located under the line Y. Luminance levels of the pixels B, C, D, E, F and G are represented by Xn−1, Xn, Xn+1, Zn−1, Zn and Zn+1, respectively.

A first line H is set so as to pass through the pixel C placed just over the attentional pixel A and the pixel F placed just under the attentional pixel A, and a second line I is set so as to pass through the pixel D placed to the right of the pixel C and the pixel E placed to the left of the pixel F. Moreover, a third line J is set so as to pass through the pixel B placed to the left of the pixel C and the pixel G placed to the right of the pixel F. Subsequently, differences Δ1, Δ2 and Δ3 (absolute values) of the luminance levels (hereinafter is referred to as luminance level difference) between two pixels on each line of the first line H, second line I and third line J are calculated by equations (1), (2) and (3), respectively.

$$\Delta 1 = |X(n) - Z(n)| \tag{1}$$

$$\Delta 2 = |X(n+1) - Z(n-1)| \tag{2}$$

$$\Delta 3 = |X(n-1) - Z(n+1)| \tag{3}$$

A smallest luminance level difference among the luminance level differences Δ1, Δ2 and Δ3 is derived, and a luminance level Y(n) of an interpolation value of the attentional pixel A is derived by equations (4), (5) or (6) for calculating averages of the luminance levels.

$$Y(n) = (X(n) + Z(n))/2 \tag{4}$$

$$Y(n) = (X(n+1) + Z(n-1))/2 \tag{5}$$

$$Y(n) = (X(n-1) + Z(n+1))/2 \tag{6}$$

When the luminance level difference Δ1 is the smallest, the luminance level Y(n) of the attentional pixel A to be interpolated is attained by the equation (4). When the luminance level difference Δ2 is the smallest, the luminance level Y(n) of the attentional pixel A is attained by the equation (5). In a similar manner, when the luminance level difference Δ3 is the smallest, the luminance level Y(n) is attained by the equation (6).

In this interpolation method, the luminance level differences between the pixels C and F, between the pixels D and E and between the pixels B and G are compared with each other. Then an interpolation line connecting the pixels of a pair having the smallest luminance level difference is determined to have continuity of an image, namely to have high correlation. Then, the average value of the luminance levels of the pixels on the interpolation line becomes an interpolation value of luminance. In the Japanese published unexamined patent application Hei 2-177683, an apparatus for determining correlation and for generating correlation data of a pixel signal is disclosed. In the prior art, the above-mentioned interpolation method is stepwisely applied and the number of interpolation lines is increased to three or more.

According to the above-mentioned conventional interpolation method, even in the case that pixels forming the image of a fine line are interpolated, an interpolation line for giving an interpolation value to the attentional pixel is decided on the basis of the above-mentioned simple comparison operation of the luminance levels of two pixels passing through the attentional pixel. Therefore, occurrence of a defective display in which the fine line is broken or cut is inevitable.

The occurrence of the defective display is described hereafter in detail/with reference to FIG. 25, FIG. 26 and FIG. 27.

FIG. 25 is a diagram representing a frame image. Pixels 521–540 have a high luminance level (high level), and pixels 541–548 have a low luminance level (low level) and display the fine line. Scanning lines 546, 548 and 550 belong to a first field and scanning lines 547 and 549 belong to a second field. In FIG. 25, description is made to interpolation operation with respect to one field of two. When field data based on the scanning lines 546, 548 and 550 are inputted, a display area 520 surrounded by a chain line is considered in detail. The display area 520 is shown in FIG. 26, and a pixel 551 on the scanning line 547 is the attentional pixel to be interpolated. The scanning lines 547 and 549 in FIG. 25 have no image data in the period of this field and are positioned between the scanning lines 546 and 548 and between the scanning lines 548 and 550, respectively.

Referring to FIG. 26, a first line 552, a second line 553 and a third line 554 are set in a manner similar to the description with respect to FIG. 24. Then, the luminance level differences $\Delta 1$, $\Delta 2$ and $\Delta 3$ are derived by the equations (1), (2) and (3), respectively. In the case of FIG. 26, when a luminance level difference of the pixels 541 and 543 on the first line 552 is a smallest, correct interpolation is carried out without any problem. However, in the simple comparison among three luminance level differences of the pixels on the first line 552, second line 553 and third line 554, there is a problematic case that the luminance level difference of the pixels on the second line 553 or the third line 554 becomes smaller than the luminance level difference of the pixels on the first line 552. In this case, the attentional pixel 551 is interpolated by an interpolation value of the pixels having the high luminance level, and hence the fine line is broken or cut as shown in FIG. 27. The erroneous interpolation is liable to arise due to nonuniformity of luminance in the image of the fine line. In FIG. 27 representing the interpolated video image by the above-mentioned interpolation operation, the pixel 551 and 555–563 on the scanning lines 547 and 549 are the interpolated pixels. In the pixels 541, 551, 543, 561 and 545 displaying the fine line, since the pixels 551 and 561 have the high luminance, the image of the fine line is cut off at two places in the frame image.

OBJECT AND SUMMARY OF THE INVENTION

An object of the present invention is to provide methods and apparatus for detecting an interpolation line which are capable of detecting easily an adequate interpolation line which is prevented from breaking of a fine line displayed in the vertical direction.

A first mode interpolation line detection method in accordance with the present invention detects an ultimate interpolation line for interpolating an attentional pixel from plural lines passing through the attentional pixel on a scanning line to be interpolated, plural pixels on an upper scanning line and plural pixels on a lower scanning line.

The first mode of interpolation line detection method comprises a first effective interpolation line detection step, a first interpolation line setting step, a second interpolation line setting step and a setting method selection step.

Then, a level difference of a first line is defined as a difference between a luminance level of an upper pixel of the upper scanning line placed just above the attentional pixel and a luminance level of a lower pixel of the lower scanning line placed just under the attentional pixel. The definitions are made similarly for a level difference of a second line passing through the upper pixel and a lower left pixel placed to the left of the lower pixel, a level difference of a third line passing through the upper pixel and a lower right pixel placed to the right of the lower pixel, a level difference of a fourth line passing through the lower pixel and an upper left pixel placed at the left of the upper pixel and a level difference of a fifth line passing through the lower pixel and an upper right pixel placed to the right of the upper pixel. Five level differences of these first, second, third, fourth and fifth lines are compared with each other. Then, a line having a smallest level difference is detected, and a first effective interpolation line information is generated by the first effective interpolation line detection step. The first mode of interpolation line detection method comprises: the first interpolation line setting step for setting a first interpolation line after detection of a line having a smallest level difference by comparing the level difference of the first line and the level difference of a sixth line passing through the upper right pixel and the lower left pixel; the second interpolation line setting step for setting a second interpolation line after detection of a line having a smallest level difference by comparing the level difference of the first line and the level difference of a seventh line passing through the upper left pixel and the lower right pixel; and the setting method selection step for selecting processing either the first interpolation line setting step or the second interpolation line setting step or employing the first line for the ultimate interpolation line without processing of these interpolation line setting steps on the basis of first effective interpolation line information.

In a second mode of interpolation line detection method in accordance with the present invention: a level difference translating step for translating the level difference of the first line on the basis of a predetermined function is added to the first mode interpolation line detection method; and the first interpolation line setting step and the second interpolation line setting step are replaced, respectively, with a third interpolation line setting step for setting a line having a smallest level difference to a third interpolation line by comparing a translated level difference of the first line and the level difference of the sixth line and a fourth interpolation line setting step for setting a line having a smallest level difference to a fourth interpolation line by comparing the translated level difference of the first line and the level difference of the seventh line.

A third mode interpolation line detection method in accordance with the present invention comprises: a second effective interpolation line detection step for generating second effective interpolation line information after detection of a line having a smallest level difference by comparing the level differences of the first line, second line and third line with each other, a third effective interpolation line detection step for generating third effective interpolation line information after detection of a line having a smallest level difference by comparing the level differences of the first line, fourth line and fifth line with each other; a base pixel detection step for outputting base pixel information of which the upper pixel is a base pixel in the case that an upper change level is larger than a lower change level, and for outputting base pixel information of which the lower pixel is the base pixel in the case that the lower change level is larger than the upper change level by comparing the upper change level with the lower change level; a detection method selection step for selecting the second effective interpolation line detection step in the case that the upper pixel is the base pixel, and for selecting the third effective interpolation line detection step in the case that the lower pixel is the base pixel on the basis of the base pixel information, a first interpolation line setting step for setting a line to the first interpolation line after detection of the line having a smallest level difference by comparing the level differences of the first line and the sixth line; a second interpolation line setting step for setting a line to the second interpolation line after detection of the line having a smallest level difference by comparing the level differences of the first line and the seventh lines; and a setting method selection step for selecting processing either the first interpolation line setting step or the second interpolation line setting step or employing the first ling for the ultimate interpolation line without processing of these interpolation line setting steps on the basis of the second effective interpolation line information or the third effective interpolation line information.

In a fourth mode interpolation line detection method in accordance with the present invention: a level difference translation step for translating the level difference of the first line on the basis of a predetermined function is added to the third interpolation line detection method, and the first and second interpolation line setting steps are replaced, respectively, with a third interpolation line setting step for setting a line having a smallest level difference to the third interpolation line by comparing the level difference after translation of the first line with the level difference of the sixth line and a fourth interpolation line setting step for setting a line having a smallest level difference to the fourth interpolation line by comparing the level difference after translation of the first line with the level difference of the seventh line.

A first mode interpolation line detection apparatus in accordance with the present invention comprises: a level difference generation means for generating the level differences of the first line, the second line, the third line, the fourth line, the fifth line, the sixth line and the seventh line; a first effective interpolation line detection means for generating the first effective interpolation line information after detection of a line having a smallest level difference by comparing the level differences of the first line, the second line, the third line, the fourth line and the fifth line with each other; a first interpolation line setting means for setting a line having a smallest level difference to the first interpolation line after detection of the line by comparing the level difference of the first line with the level difference of the sixth line; a second interpolation line setting means for setting a line having a smallest level difference to the second interpolation line after detection of the line by comparing the level difference of the first line with the level difference of the seventh line; and a first interpolation line selection and decision means for selecting and deciding the ultimate interpolation line from the first interpolation line, the second interpolation line and the first line on the basis of the first effective interpolation line information.

In a second mode interpolation line detection apparatus in accordance with the present invention, level difference translation means for translating the level difference of the first line on the basis of a predetermined function is added to the first interpolation line detection apparatus. Moreover, the first and second interpolation line setting means are replaced, respectively, with third interpolation line setting means for setting a line having a smallest level difference to the third interpolation line by comparing the level difference of the first line after translation with the level difference of the sixth line and fourth interpolation line setting means for setting a line having a smallest level difference to the fourth interpolation line by comparing the level difference of the first line after translation with the level difference of the seventh line. Moreover, second interpolation line selection and decision means for selecting and deciding the ultimate interpolation line from the third interpolation line, the fourth interpolation line and the first line on the basis of the first effective interpolation line information is attached as replacement for the first interpolation line selection and decision means.

A third mode interpolation line detection apparatus comprises: level difference generation means for generating the level differences of the first line—the seventh line; second effective interpolation line detection means for generating the second effective interpolation line information after detection of a line having a smallest level difference by comparing the level differences of the first line—the third line with each other; third effective interpolation line detection means for generating the third effective interpolation line information after detection of a line having a smallest level difference by comparing the level differences of the first line, fourth line and fifth line with each other; first interpolation line setting means for setting a line to the first interpolation line after detection of the line having a smallest level difference by comparing the level differences of the first line and the sixth line with each other; second interpolation line setting means for setting a line to the second interpolation line after detection of the line having a smallest level difference by comparing the level differences of the first line and the seventh line with each other; base pixel detection means for outputting base pixel information of which the upper pixel is a base pixel in the case that the upper change level is larger than the lower change level by comparing the upper change level with the lower change level, and moreover for outputting base pixel information of which the lower pixel is the base pixel in the case that the lower change level is larger than the upper change level; an effective interpolation line selection means for selecting either the second effective interpolation line information or the third effective interpolation line information on the basis of the base pixel information; and first interpolation line selection and decision means for selecting and deciding the ultimate interpolation line from the first interpolation line, the second interpolation line and the first line on the basis of the second effective interpolation line information or the third effective interpolation line information selected by the effective interpolation line selection means.

In a fourth mode interpolation line detection apparatus, level difference translation means for translating the level difference of the first line on the basis of a predetermined function is added to the third interpolation line detection apparatus. The first and the second interpolation line setting means are replaced, respectively, with third interpolation line setting means for setting a line having a smallest level difference to the third interpolation line by comparing the level difference of the first line after translation with the level difference of the sixth line and fourth interpolation line setting means for setting a line having a smallest level difference to the fourth interpolation line by comparing the level difference of the first line after translation with the level difference of the seventh line. Moreover, the first interpolation line selection and decision means is replaced with second interpolation line selection and decision means for selecting and deciding the ultimate interpolation line from the third interpolation line, the fourth interpolation line and the first line on the basis of the first effective interpolation line information.

In the first mode interpolation line detection method in accordance with the present invention, first, the line having the smallest level difference which becomes effective to interpolate the attentional pixel is detected by comparing the level differences of the first line—the fifth line of which the upper pixel or the lower pixel is the base pixel with each other. In the level differences of the first line—the fifth line, the case that the level difference of the second line or the level difference of the fifth line is smaller than the level differences of other lines is classified into a second pattern. The case that the level difference of the third line or the level difference of the fourth line is smaller than the level differences of other lines is classified into a third pattern. Moreover, the case which is not the second pattern nor the third pattern is classified into a first pattern. Then, in the case of the second pattern, a line having a smallest level difference is set as the first interpolation line by comparing only the level difference of the first line with the level difference of the sixth line.

Moreover, in the case of the third pattern, a line having a smallest level difference is set as the second interpolation line by comparing only the level difference of the first line with the level difference of the seventh line, and in the case of the first pattern, the first line is set as the ultimate interpolation line. Namely, in the detection method, since an effective ultimate interpolation line is detected by comparing the level differences of the lines of which the upper pixel or the lower pixel is the base pixel, break of the fine line on the image screen does not frequently occur. The first interpolation line detection apparatus in accordance with the present invention is the apparatus for realizing the first interpolation line detection method, and by the first interpolation line detection apparatus, an interpolation line of which the break of the fine line does not frequently occur can be detected.

In the second mode interpolation line detection method in accordance with the present invention, the level difference translation step for translating the level difference of the first line on the basis of a predetermined function is added to the first interpolation line detection method. In the case that differences among the level differences of the first line—the fifth line are small, selection of the first line is made easy. Therefore, influence of noise is prevented, and an image quality is improved. The second interpolation line detection apparatus in accordance with the present invention is the apparatus for realizing the second interpolation line detection method.

In the third mode interpolation line detection method in accordance with the present invention, the level differences of the first, the second and the third line of which the upper pixel is the base pixel are compared with each other. Moreover, the level differences of the first line, the fourth line and the fifth line of which the lower pixel is the base pixel are compared with each other. By the above-mentioned comparison, a line having a smallest level difference which becomes effective to interpolate the attentional pixel is detected. Subsequently, the upper pixel or the lower pixel is designated to the base pixel by comparing the upper change level in the vicinity of the upper pixel with the lower change level in the vicinity of the lower pixel. The case that the level difference of the second line or the fifth line in the level differences of the first—the fifth lines is smaller than the level differences of other lines is classified into the second pattern, the case that the level difference of the third line or the level difference of the fourth line is smaller than the level differences of other lines is classified into the third pattern, and the case which is not the second pattern nor the third pattern is classified into the first pattern. In the case of the second pattern, a line having a smallest level difference is set as the first interpolation line by comparing only the level difference of the first line with the level difference of the sixth line.

Moreover, in the case of the third pattern, a line having a smallest level difference is set as the second interpolation line by comparing only the level difference of the first line with the level difference of the seventh line. Moreover, in the case of the first pattern, the first line is set as the ultimate interpolation line. According to this method, break of the fine line in the image screen does not frequently occur, and furthermore detection of an interpolation line corresponding to a fine line along a diagonal direction to some extent is made possible. The third interpolation line detection apparatus in accordance with the present invention is the apparatus configured to realize the third interpolation line detection method.

In the fourth mode interpolation line detection method in accordance with the present invention, the level difference translation step is added to the third interpolation line detection method. In the case that differences among the level differences of the first line—fifth line are not so large, selection of the first line is made easy. Therefore, the influence of the noise is prevented, and the image quality is improved. The fourth interpolation line detection apparatus in accordance with the present invention is the apparatus to realize the fourth interpolation line detection method.

As described above, according to the interpolation line detection method and the interpolation line detection apparatus in accordance with the present invention, even in the case of interpolation of the fine line which is displayed in the vertical direction or in the diagonal direction on an video image displaying a tone image and on the image of an information apparatus, the break of the fine line is prevented. Moreover, detection of the interpolation line which is not influenced by noise is made possible.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF THE EMBODIMENTS

First Embodiment

Figure 1:
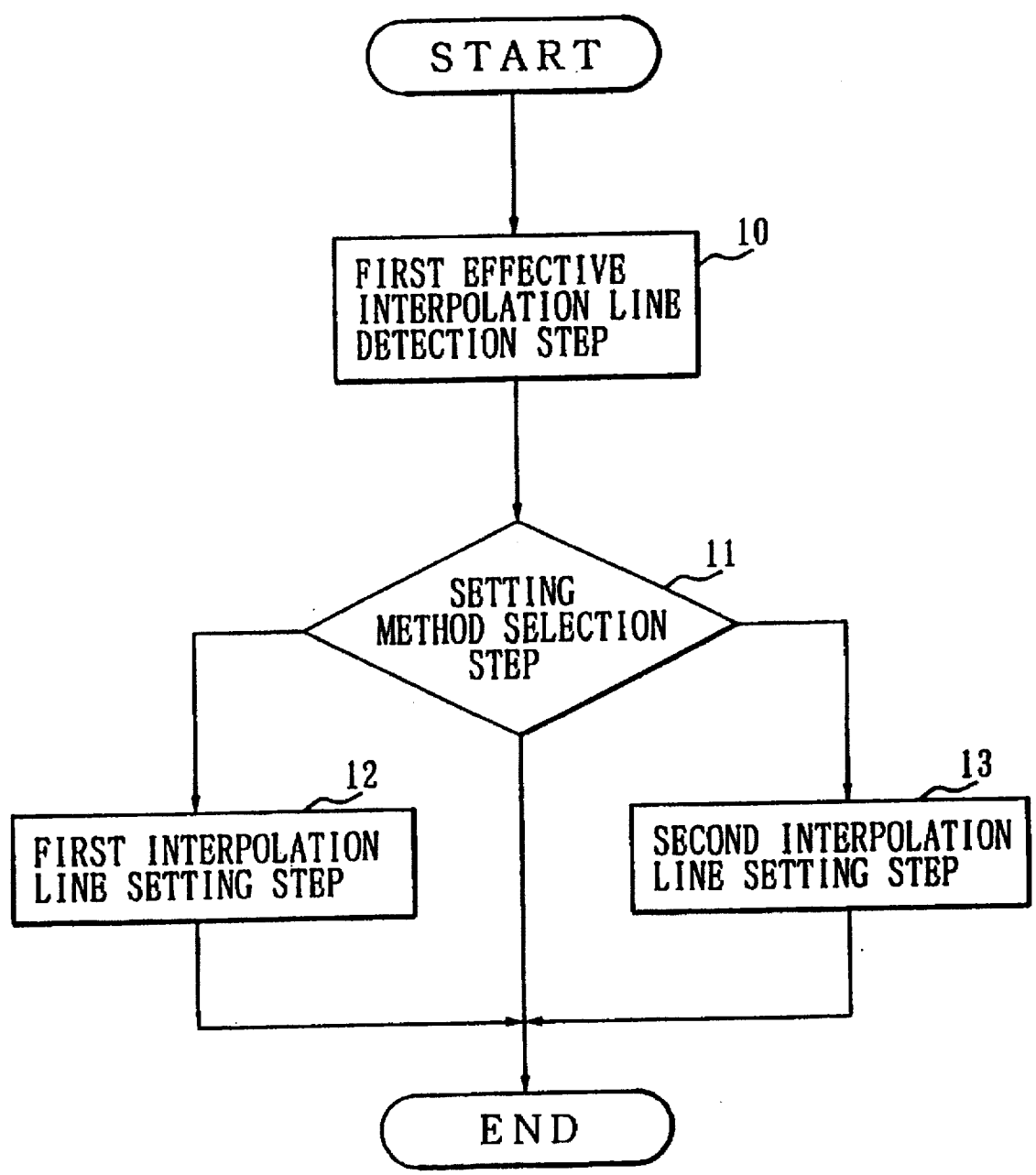
FIG. 1 is a flow chart of the process of a first interpolation line detection method in accordance with the present invention.
Figure 2A:
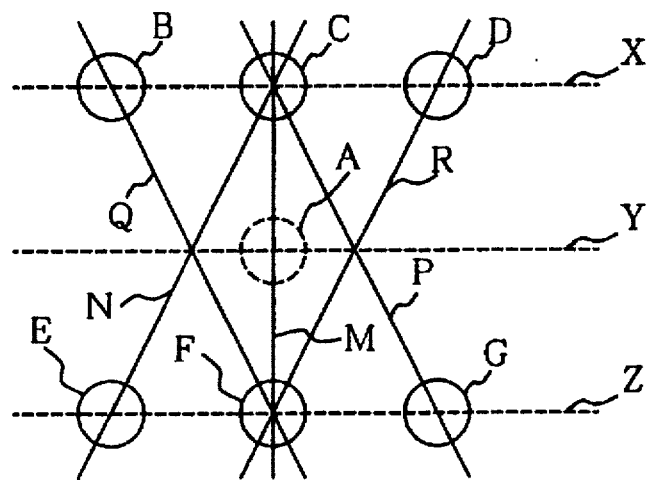
FIG. 2A, FIG. 2B and FIG. 2C are diagrams showing principle of the interpolation line detection method in accordance with the present invention.
Figure 2B:
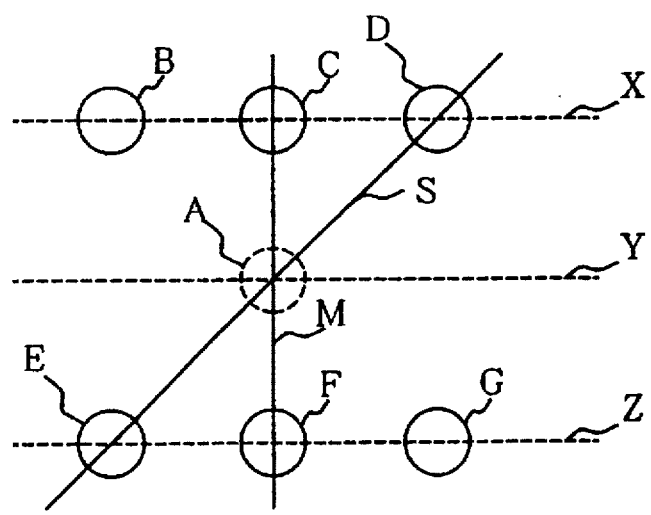
Figure 2C:
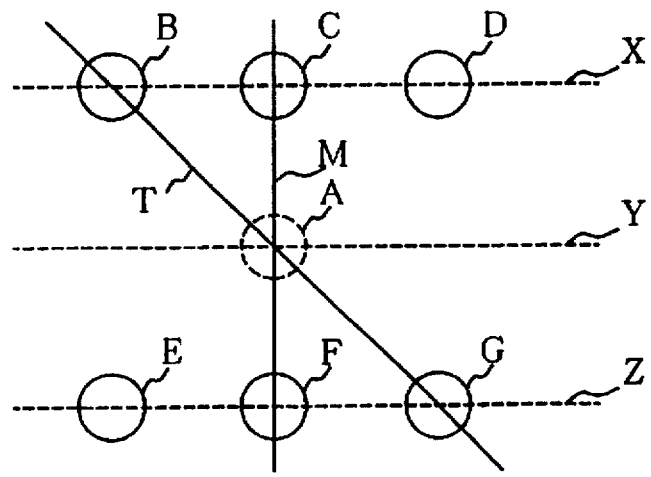
Figure 3:
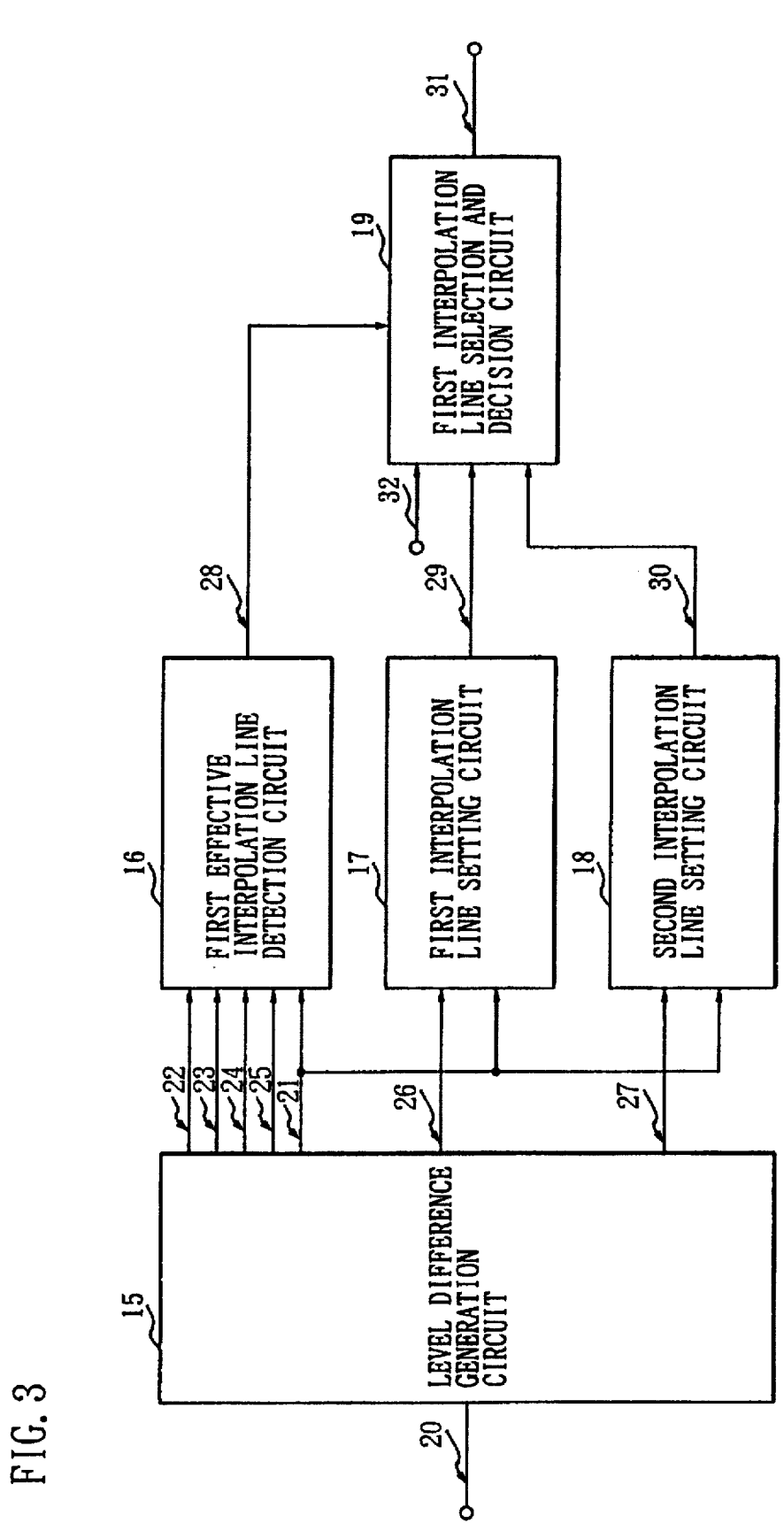
FIG. 3 is a block diagram of a first interpolation line detection apparatus in accordance with the present invention.

FIG. 1 is a flow chart of the process of a first interpolation line detection method of the first embodiment in accordance with the present invention. FIG. 2A, FIG. 2B and FIG. 2C are diagrams illustrating the principle of the interpolation line detection method of the present invention. FIG. 3 is a block diagram of a first interpolation line detection apparatus in accordance with the present invention. In the first interpolation line detection method of the first embodiment, as shown in FIG. 2A, FIG. 2B and FIG. 2C, an ultimate interpolation line for interpolating an attentional pixel A is detected by using plural lines M, N, P, Q, R, S and T passing through pixels B, C or D on an upper scanning line X and pixels E, F or G on a lower scanning line Z. As shown in FIG. 1, the first interpolation line detection method comprises a first effective interpolation line detection step 10, a setting method selection step 11, a first interpolation line setting step 12 and a second interpolation line setting step 13.

A difference between a luminance level of an upper pixel C on the line X placed just above the attentional pixel A and a luminance level of a lower pixel F on the line Z placed just under the attentional pixel A on an image is derived at the first effective interpolation line detection step 10. A first line M passing through the pixels C and F is set, and the above-mentioned difference between both the luminance levels is defined as a "level difference of the first line M". In a similar manner, a second line N passing through the upper pixel C and a lower left pixel E placed to the left of the lower pixel F is set. A difference between the luminance levels of the upper pixel C and the lower left pixel E is derived, and the difference between the luminance levels is defined as a "level difference of the second line N". A third line P passing through the upper pixel C and a lower right pixel G placed to the right of the lower pixel F is set. A difference between luminance levels of the upper pixel C and a lower right pixel G is derived, and the difference between the luminance levels is defined as a "level difference of the third line P". A fourth line Q passing through the lower pixel F and an upper left pixel B placed to the left of the upper pixel C is set. A difference between luminance levels of the lower pixel F and the upper left pixel B is derived, and the difference between the luminance levels is defined as a "level difference of the fourth line Q". A fifth line R passing through the lower pixel F and an upper right pixel D placed to the right of the upper pixel C is set. A difference between luminance levels of the lower pixel F and upper right pixel D is derived, and the difference between the luminance levels is defined as a "level difference of the fifth line R". Subsequently, the level differences of the first line M, the second line N, the third line P, the fourth line Q and the fifth line R are compared with each other, and a line having a smallest level difference is detected. In this operation, the number of lines having the smallest level difference is not limited to one.

At the first effective interpolation line detection step 10, first effective interpolation line information is generated by using the smallest level difference and investigating patterns of the smallest level difference as described below. Namely, the case that the level difference of the second line N or the level difference of the fifth line R is smallest in the level differences of the first line M—the fifth line R, and the level differences of the first line M, the third line P and the fourth line Q are not smallest is classified into a "second pattern". Moreover, the case that the level difference of the third line P or the level difference of the fourth line Q is smallest and the level differences of the first line M, the second line N and the fifth line R are not smallest is classified into a "third pattern". The case which is not the second pattern nor the third pattern is classified into a "first pattern". Consequently, respective first effective interpolation line information corresponding to the first, second and third patterns are generated at the effective interpolation line detection step 10.

These first, second and third patterns represent the heights of correlation along various directions in the case that the upper pixel C and the lower pixel F are base pixels. Namely, the second pattern represents that the correlation is high along the direction from upper right to lower left. Moreover, the third pattern represents that the correlation is high along the direction from upper left to lower right. On the other hand, the first pattern represents that the correlation is high in the vertical direction. The case that determination of the correlation is difficult is classified into the first pattern.

At the setting method selection step 11, one of operation at the first interpolation line setting step 12 or the second interpolation line setting step 13 and operation for deciding the first line M to the ultimate interpolation line without operation at the interpolation line setting step 12 or 13 is selected on the basis of the first effective interpolation line information from the first effective interpolation line detection step 10. First, in the case that the first effective interpolation line information represents the second pattern, the operation at the first interpolation line setting step 12 is selected. At the interpolation line setting step 12, as shown in FIG. 2B, the level difference of the first line M is compared with the level difference of the sixth line S passing through the upper right pixel D and lower left pixel E, and a "line having a smallest level difference", which is defined by a line passing through two pixels of which a difference between the luminance levels of the two pixels is smallest, is detected. The detected line is set as a first interpolation line. In the case that the level difference of the sixth line S is smaller than the level difference of the first line M, the sixth line S is set as the ultimate interpolation line.

Moreover, in the case that the first effective interpolation line information represents the third pattern, operation at the second interpolation line setting step 13 is selected. At the interpolation line setting step 13, as shown in FIG. 2C, the level difference of the first line M is compared with the level difference of the seventh line T passing through the upper left pixel B and lower right pixel G and a line having a smallest level difference is detected. The detected line is set as a second interpolation line. Moreover, in the case that the level difference of the seventh line T is smaller than the level difference of the first line M, the seventh line T is set as the ultimate interpolation line. Furthermore, in the case that the first effective interpolation line information represents the first pattern, the operations at the interpolation line setting steps 12 and 13 are not performed, and the first line M is set as the ultimate interpolation line.

Figure 26:
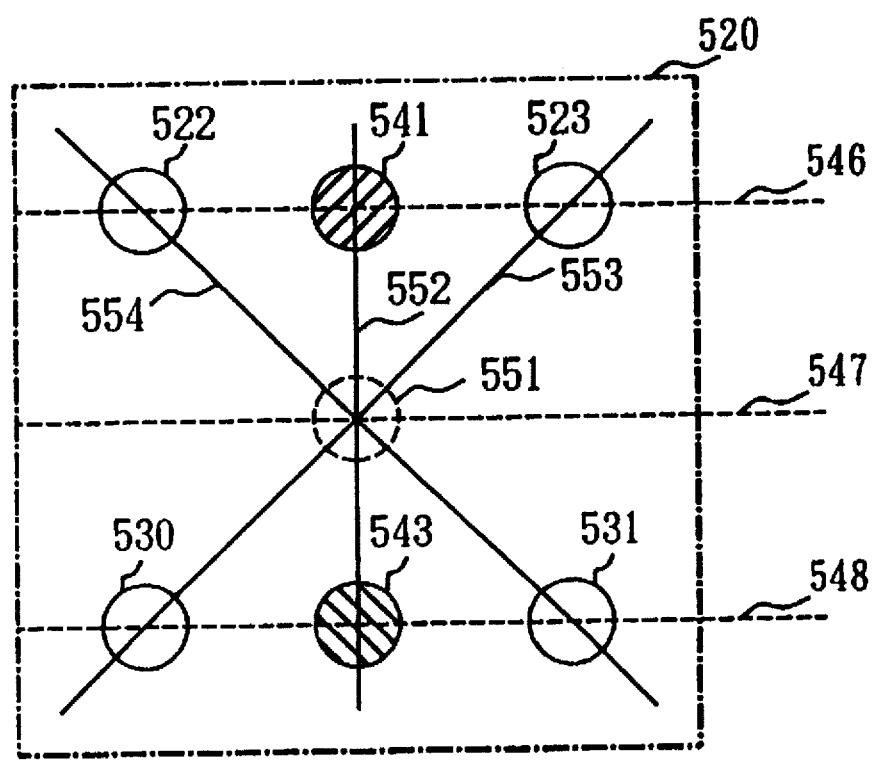
FIG. 26 is the diagram illustrating the problem in the conventional method.
Figure 27:
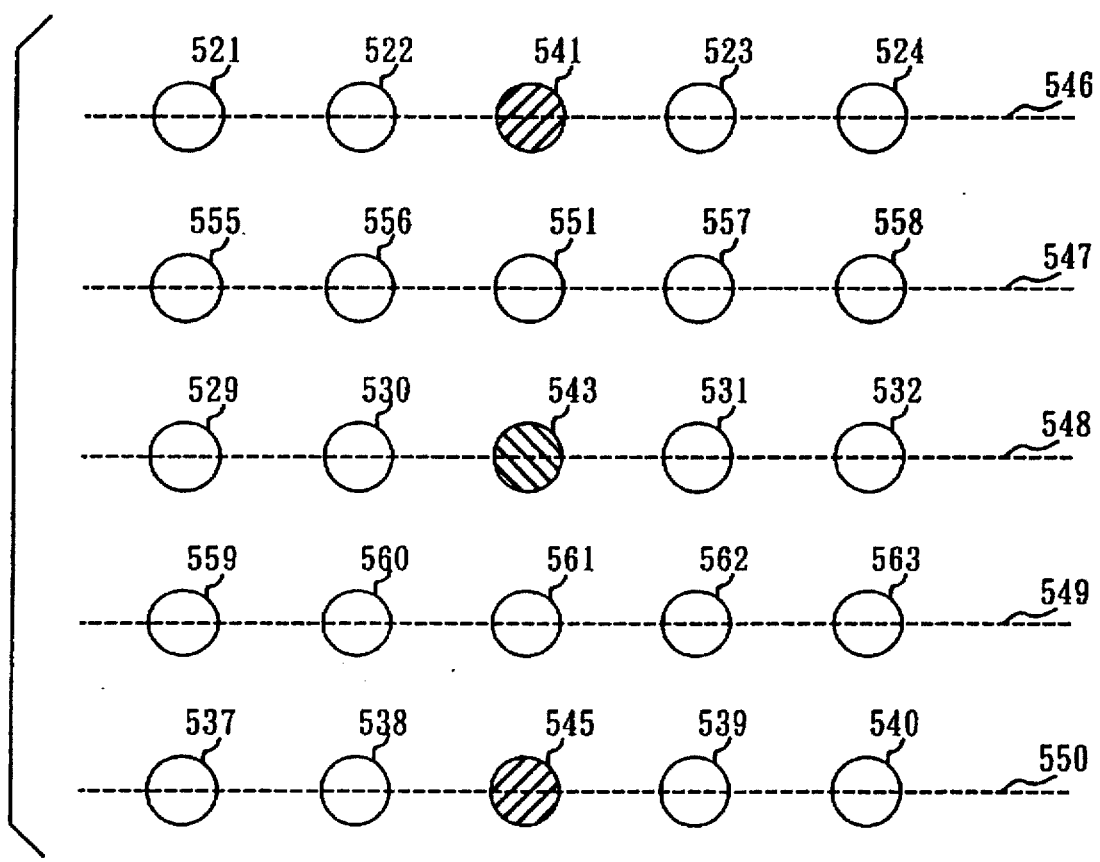
FIG. 27 is the diagram illustrating the problem in detail in the conventional method.

By the above-mentioned process, the ultimate interpolation line which is optimum to the interpolation of the attentional pixel A is detected from the first line M—the seventh line T. According to the application of the above-mentioned process, the example as shown in FIG. 26 in the prior art represents apparently the first pattern, and the first line M (FIG. 2) is detected as the ultimate interpolation line. Consequently break of the fine line on the image does not arise.

With reference to FIG. 3, the first interpolation line detection apparatus is described hereafter. The interpolation line detection apparatus in accordance with the first embodiment is to realize the first interpolation line detection method described above, and comprises a level difference generation circuit 15, a first effective interpolation line detection circuit 16, a first interpolation line setting circuit 17, a second interpolation line setting circuit 18 and a first interpolation line selection and decision circuit 19.

First, an input signal 20 is inputted to the level difference generation circuit 15. The level difference generation circuit 15 generates a level difference 21 of the first line M passing through the upper pixel C and the lower pixel F, a level difference 22 of the second line N passing through the upper pixel C and the lower left pixel E, a level difference 23 of the third line P passing through the upper pixel C and lower right pixel G, a level difference 24 of the fourth line Q passing through the lower pixel F and the upper left pixel B, a level difference 25 of the five line R passing through the lower pixel F and the upper right pixel D, a level difference 26 of the sixth line S passing through the upper right pixel D and lower left pixel E and a level difference 27 of the seventh line T passing through the upper left pixel B and lower right pixel G.

Subsequently, the respective level differences 21–25 of the first line M—the fifth line R generated by the level difference generation circuit 15 are applied to the first effective interpolation line detection circuit 18. Then, a line having a smallest level difference is detected by the first effective interpolation line detection circuit 16. In this operation, the number of the lines having the smallest level difference is not limited to one. Moreover, in the first effective interpolation line detection circuit 16, in the respective level differences 21–25 of the first line M—the fifth line R, the case that the level difference 22 of the second line N or the level difference 25 of the fifth line R is the smallest is classified into the second pattern, the case that the level difference 23 of the third line P or the level difference 24 of the fourth line Q is the smallest is classified into the third pattern, and the case which is not the second pattern nor the third pattern is classified into the first pattern. Furthermore, respective first effective interpolation line information 28 corresponding to the first, second and third patterns are generated in the first effective interpolation line detection circuit 16. The first effective interpolation line information 28 is applied to the first interpolation line selection and decision circuit 19.

On the other hand, the level difference 21 of the first line M and the level difference 26 of the sixth line S generated by the level difference generation circuit 15 is applied to the first interpolation line setting circuit 17. In the interpolation line setting circuit 17, the level difference 21 of the first line M is compared with the level difference 26 of the sixth line S, and a line having a smallest level difference is detected. The detected line is set as a first interpolation line 29. Namely, when the level difference 21 of the first line M is the level difference 26 of the sixth line S and below, the first line M is set as the first interpolation line 29, and when the level difference 26 of the sixth line S is smaller than the level difference 21 of the first line M, the sixth line S is set as the first interpolation line 29.

Moreover, the level difference 21 of the first line M and the level difference 27 of the seventh line T generated by the level difference generation circuit 15 are applied to the second interpolation line setting circuit 18. In the second interpolation line setting circuit 18, the level difference 21 of the first line M is compared with the level difference 27 of the seventh line T, and a line having a smallest level difference is detected. The detected line is set as a second interpolation line 30. Namely, when the level difference 21 of the first line M is the level difference 27 of the seventh line T and below, the first line M is set as the second interpolation line 30. Moreover, when the level difference 21 of the first line M is larger than the level difference 27 of the seventh line T, the seventh line T is set as the second interpolation line 30.

Data of the first interpolation line 29 output from the first interpolation line setting circuit 17, the second interpolation line 30 output from the second interpolation line setting circuit 18 and the first line M transmitted through a signal line 32 are inputted to the first interpolation line selection and decision circuit 19. In the interpolation line selection and decision circuit 19, an ultimate interpolation line 31 is selected and decided from the first interpolation line 29, the second interpolation line 30 and the first line M on the basis of the first effective interpolation line information 28 representing three patterns output from the first effective interpolation line detection circuit 16. Namely, in the first interpolation line selection decision circuit 19, in the case that the first effective interpolation line information 28 represents the second pattern, the first interpolation line 29 is set as the ultimate interpolation line 31. Moreover, in the case that the effective interpolation line information line 28 represents the third pattern, the second interpolation line 30 is set as the ultimate interpolation line 31. Furthermore, in the case that the effective interpolation line information 28 represents the first pattern, the first line M is set as the ultimate interpolation line 31.

Figure 4:
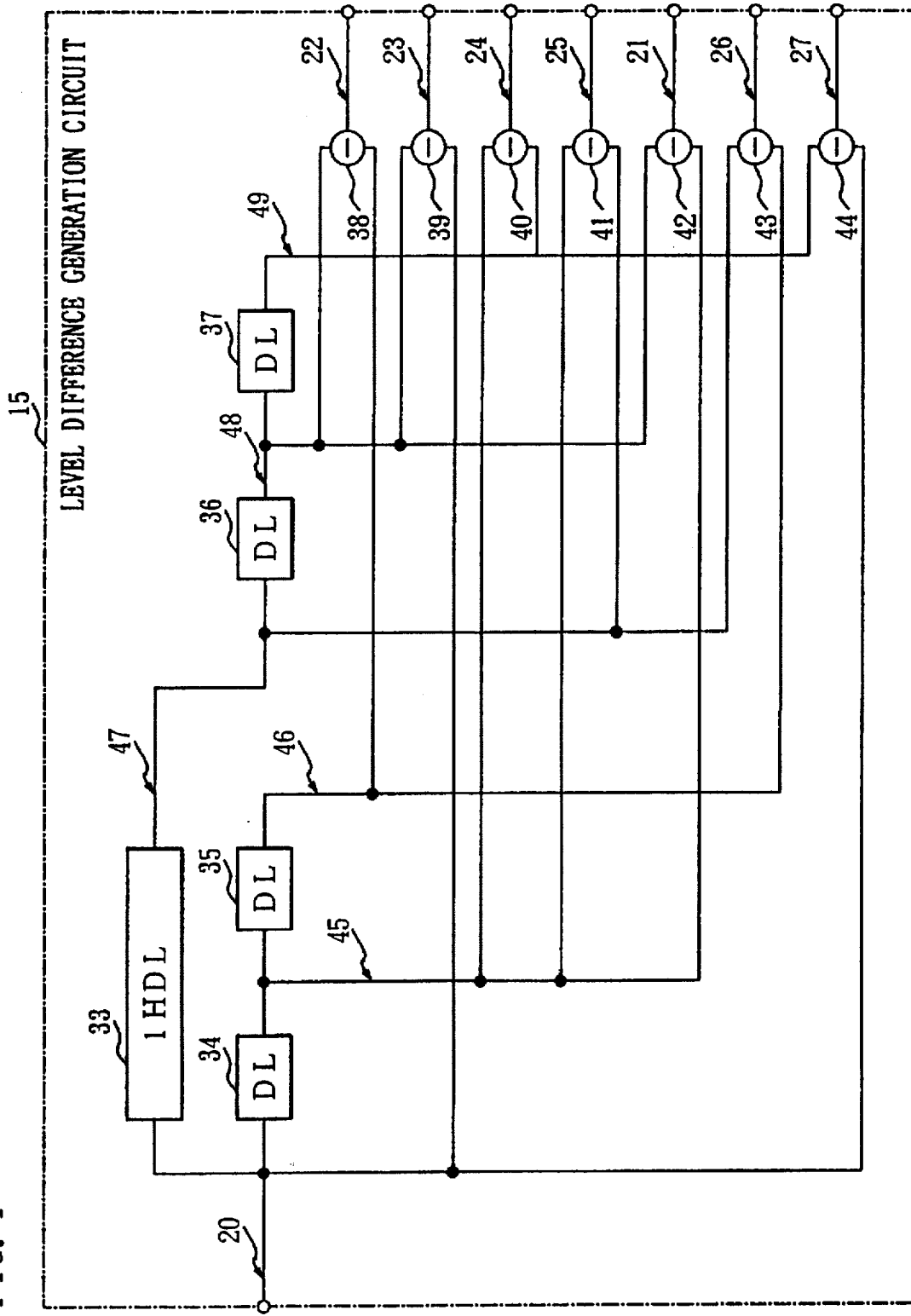
FIG. 4 is a block diagram of a level difference generation circuit.

FIG. 4 is a block diagram of the level difference generation circuit 15. The level difference generation circuit 15 comprises a vertical delay circuit 33 for delaying by a time period of one scanning line, delay circuits 34–37 for delaying by a time period of one pixel and operation circuits 38–44 for calculating the level differences 21–27 of the first line M—the seventh line T, respectively.

The delay circuits 34, 35 delay the input signal by the time period of one pixel, and thereby the data of three pixels E, F and G on the line Z placed under the attentional pixel A are simultaneously processed. Moreover, the data of three pixels B, C and D on the line X placed over the attentional pixel A are also simultaneously processed by delay operation of the vertical delay circuit 33 and the delay circuits 36 and 37. Consequently, the pixels B, C, D, E, F and G in the vicinity of the attentional pixel A are simultaneously processed in the level difference generation circuit 15. In FIG. 4, the signal 20 corresponds to the level of the lower right pixel G, a signal 45 corresponds to the level of the lower pixel F and a signal 46 corresponds to the lower left pixel E. Moreover, signals 47, 48 and 49 correspond to the levels of the upper right pixel D, the upper pixel C and the upper left pixel B, respectively.

The level difference 21 of the first line M is derived by the operation circuit 42. In the operation circuit 42, in order to generate the level difference 21 of the first line N, the level of the signal 45 of the lower pixel F is subtracted from the level of the signal 48 of the upper pixel C, and the absolute value of a difference is derived. In a similar manner, the level difference 22 of the second line M, the level difference 23 of the third line P and the level difference 24 of the fourth line Q are derived by the operation circuits 38, 39 and 40, respectively. Moreover, the level difference 25 of the fifth line R, the level difference 26 of the sixth line S and the level difference 27 of the seventh line T are derived by the operation circuits 41, 43 and 44, respectively.

Figure 5:
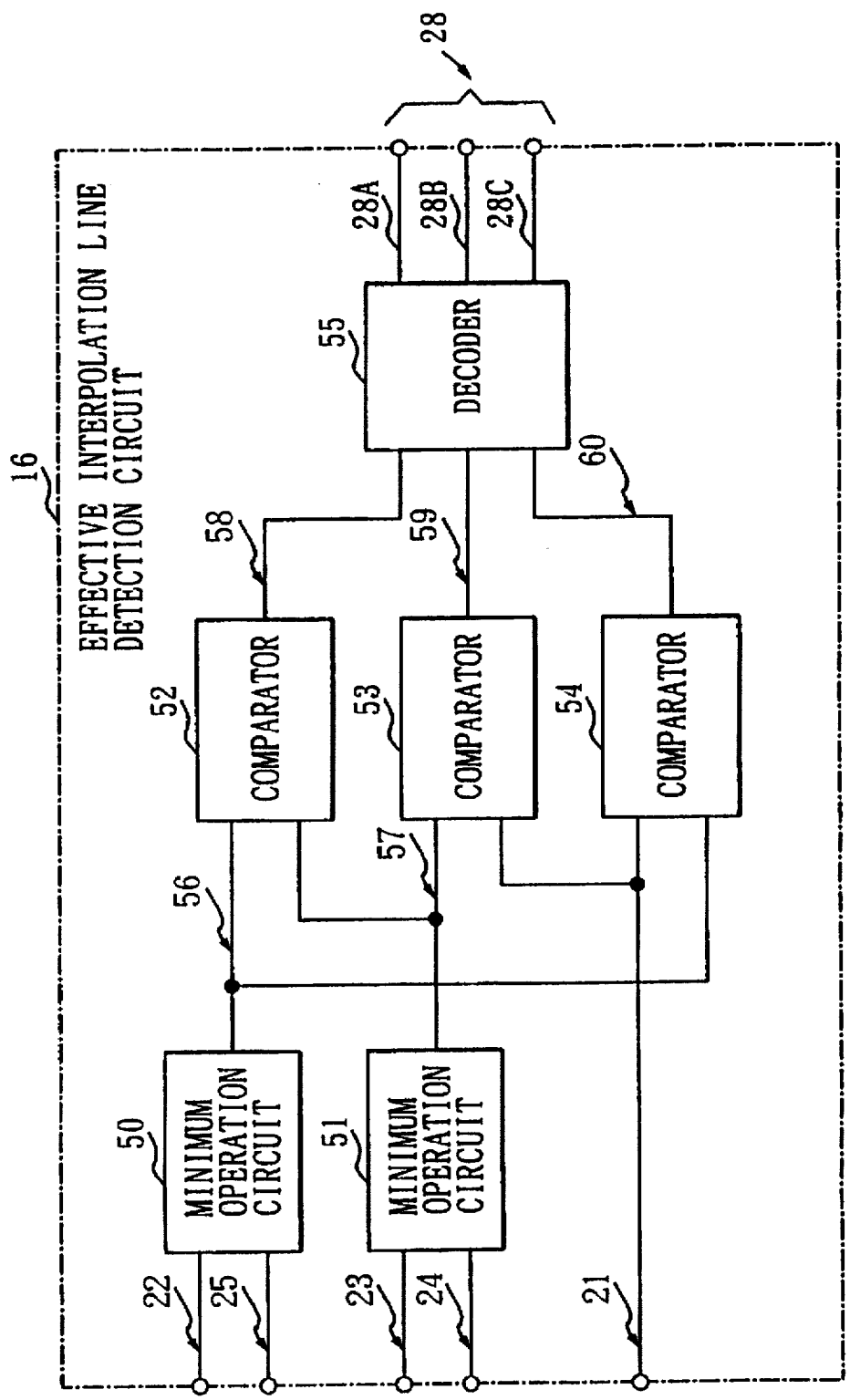
FIG. 5 is a block diagram of an effective interpolation line detection circuit.

FIG. 5 is a block diagram of the first effective interpolation line detection circuit 16. The first effective interpolation line detection circuit 16 comprises smallest operation circuits 50 and 51 for outputting a smallest value of the input signal, comparators 52–54 and a decoder 55. Incidentally, the smallest operation circuits 50 and 51 can be configured so as to compare the input signals and output a smaller signal by a selector on the basis of a resultant signal of comparison (not shown).

First, the level difference 22 of the second line N and the level difference 25 of the fifth line R are inputted to the smallest operation circuit 50, and a smaller value 56 (hereinafter is referred to as second smallest level difference 56) is output therefrom. Moreover, the level difference 23 of the third line P and the level difference 24 of the fourth line Q are inputted to the smallest operation circuit 51, and a smaller value 57 (hereinafter is referred to as third smallest level difference 57) is out therefrom. Subsequently, the level difference 21 of the first line M, the second smallest level difference 56 and the third smallest level difference 57 are compared with each other by the comparators 52–54. The level differences are classified into three patterns, namely the first, second or third pattern, by the decoder 55 on the basis of the comparison result. In the comparator 52, the second smallest level difference 56 is compared with the third smallest level difference 57, and a comparison result 58 is applied to the decoder 55. In a similar manner, the level difference 21 of the first line M is compared with the third smallest level difference 57 by the comparator 53, and a comparison result 59 is applied to the decoder 55. Moreover, the level difference 21 of the first line M is compared with the second smallest level difference 56 by the comparator 54, and a comparison result 60 is applied to the decoder 55.

In the decoder 55, the case that the second smallest level difference 56 is smaller than the level difference 21 of the first line M and the third smallest level difference 57 is determined to be the second pattern, and a high level signal is output to a signal line 28B and a low level signal is output to signal lines 28A and 28C. Furthermore, in the decoder 55, the case that the third smallest level difference 57 is smaller than the level difference 21 of the first line M and the second smallest level difference 56 is determined to be the third pattern, and the high level signal is output to the signal line 28C and the low level signal is output to the signal lines 28A and 28B. Moreover, in the decoder 55, the case which is not the second pattern nor the third pattern is determined to be the first pattern, and the high level signal is output to the signal line 28A and the low level signal is output to the signal lines 28B and 28C. By the above-mentioned process, it is detected that an environmental state of the attentional pixel A corresponds to which pattern of three.

Figure 6:
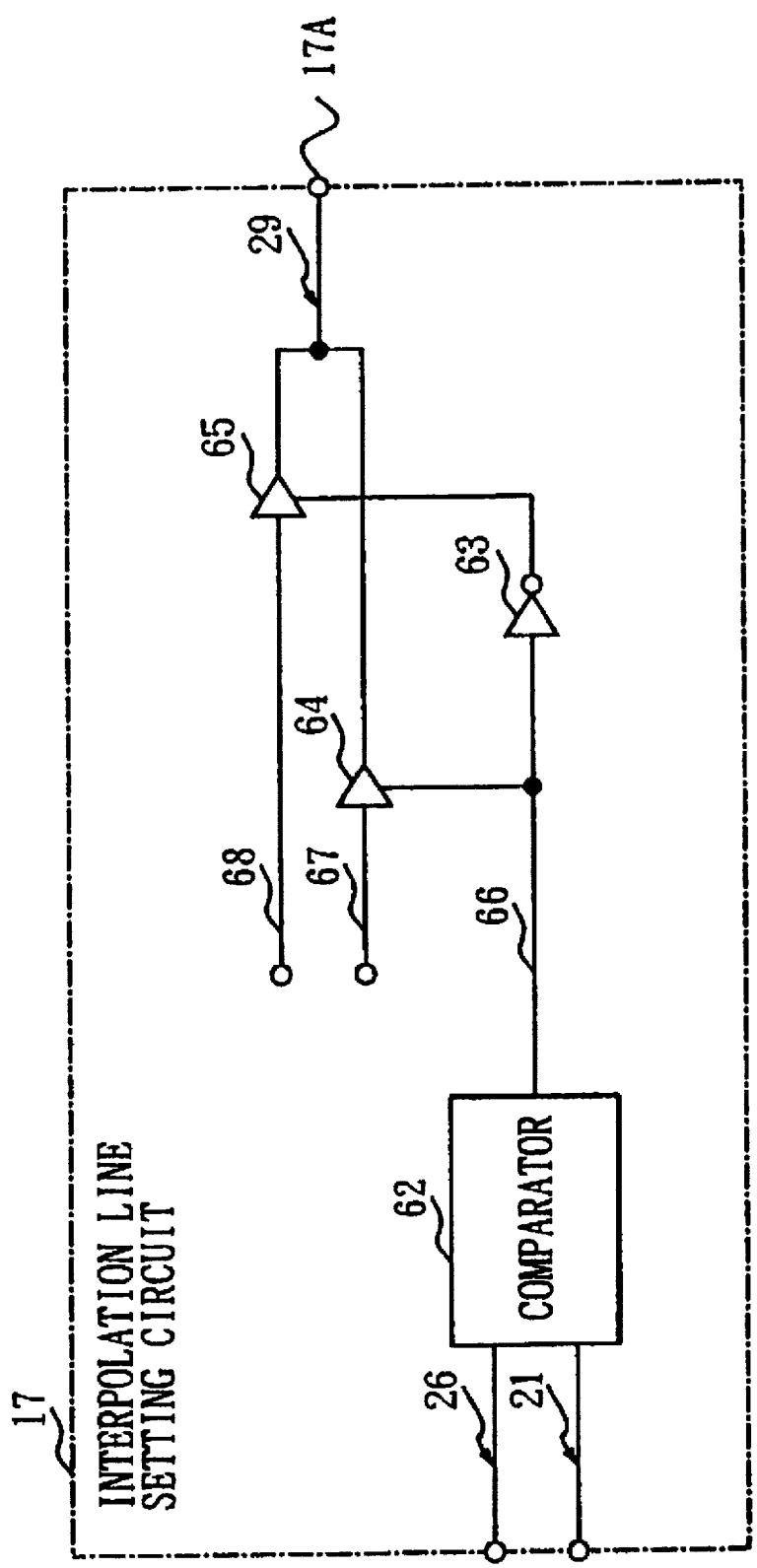
FIG. 6 is a block diagram of an interpolation line setting circuit.

FIG. 6 is a block diagram of the first interpolation line setting circuit 17. The first interpolation line setting circuit 17 comprises a comparator 62, a logic element 63 and three-state buffer gates 64 and 65. The level difference 26 of the sixth line S is compared with the level difference 21 of the first line M in the comparator 62. Consequently, when the level difference 26 of the sixth line S is smaller than the level difference 21 of the first line M, a high level signal is output to a signal line 66, and when the level difference 26 is not smaller than the level difference 21, a low level signal is output to the signal line 66. The signal line 66 is connected to the logic element 63. In the logic element 63, when the input signal is the high level signal, a low level signal is output, and when the input signal is the low level signal, a high level signal is output. Consequently, only one of the buffer gates 64 and 65 becomes an active state without fail.

Figure 24:
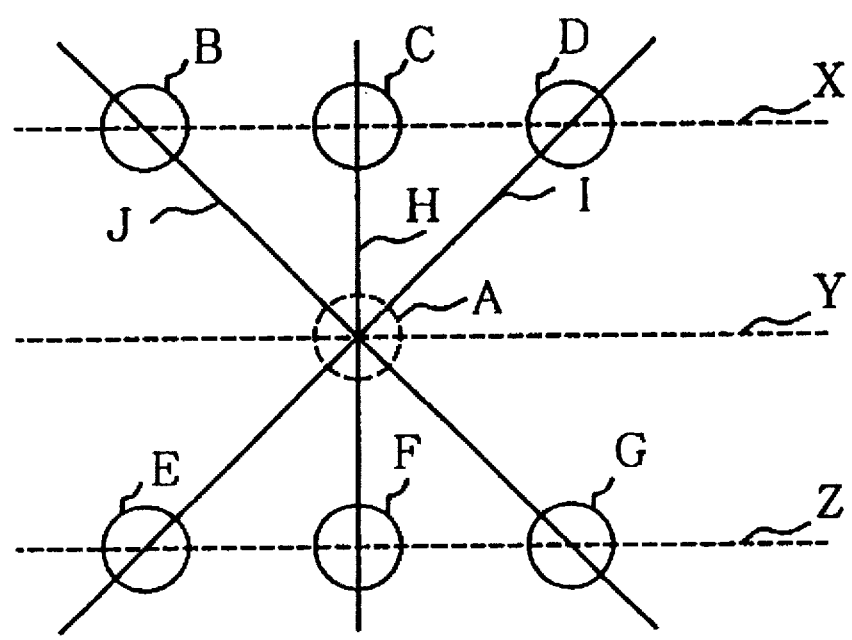
FIG. 24 is the diagram illustrating principle of the interpolation line detection method in the prior art.
Figure 25:
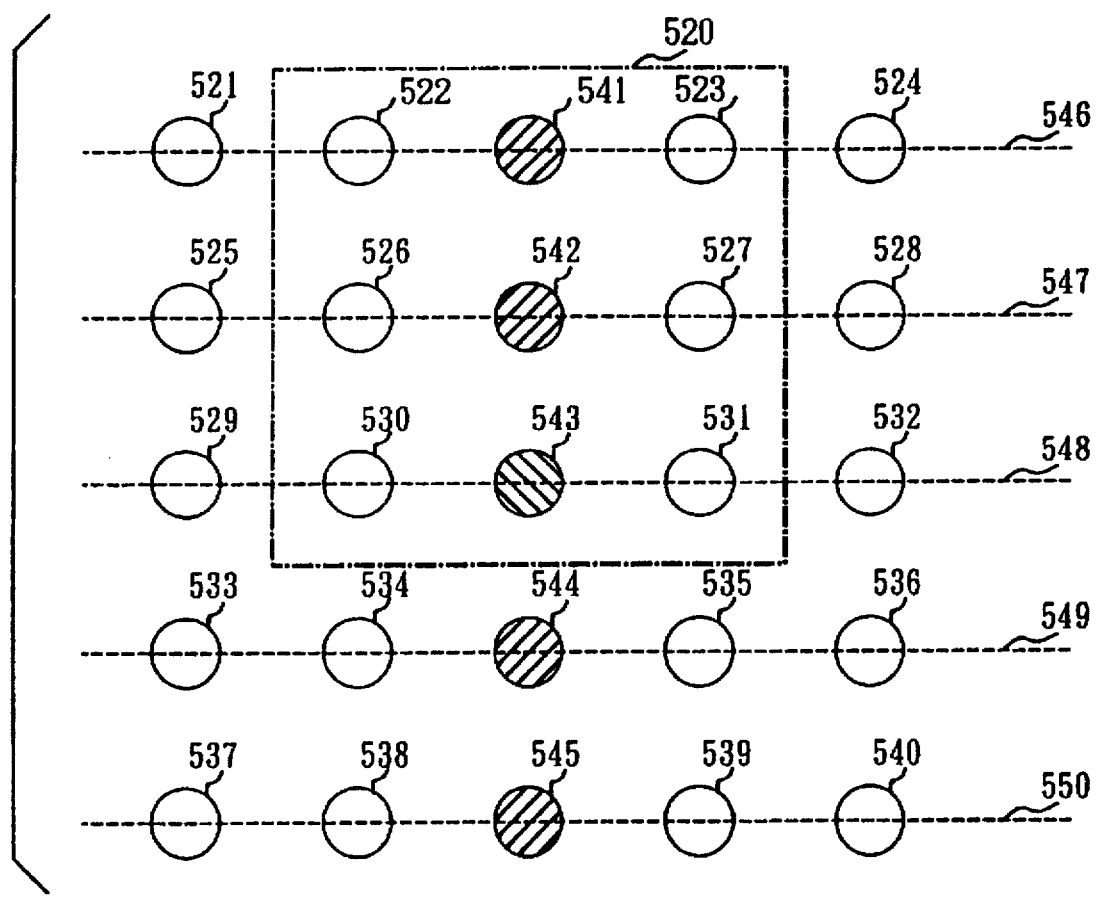
FIG. 25 is the diagram illustrating the problem in the conventional method.

Subsequently, the first line M, the sixth line S and the seventh line T are represented by integers "1", "2" and "3", respectively. Namely, the integer "1" represents an interpolation line in the vertical direction (the line H in FIG. 24), the integer "2" represents an interpolation line in the direction from upper right to lower left (the line I in FIG. 24), and the integer "3" represents an interpolation line in the direction from upper left to lower right (the line J in FIG. 24). Therefore, when the signal line 66 has the high level signal, the buffer gate 64 becomes the active state, and the signal of the integer "2" transmitted through a signal line 67 is output as the first interpolation line 29. On the other hand, the signal line 66 has the low level signal, the buffer gate 65 becomes the active state, and the signal of the integer "1" transmitted through a signal line 68 is output as the first interpolation line 29. The output terminals of the buffer gates 64 and 65 are connected into a wired-OR circuit, and data of the first interpolation line 29 is output to a terminal 17A of the interpolation line setting circuit 17.

Figure 7:
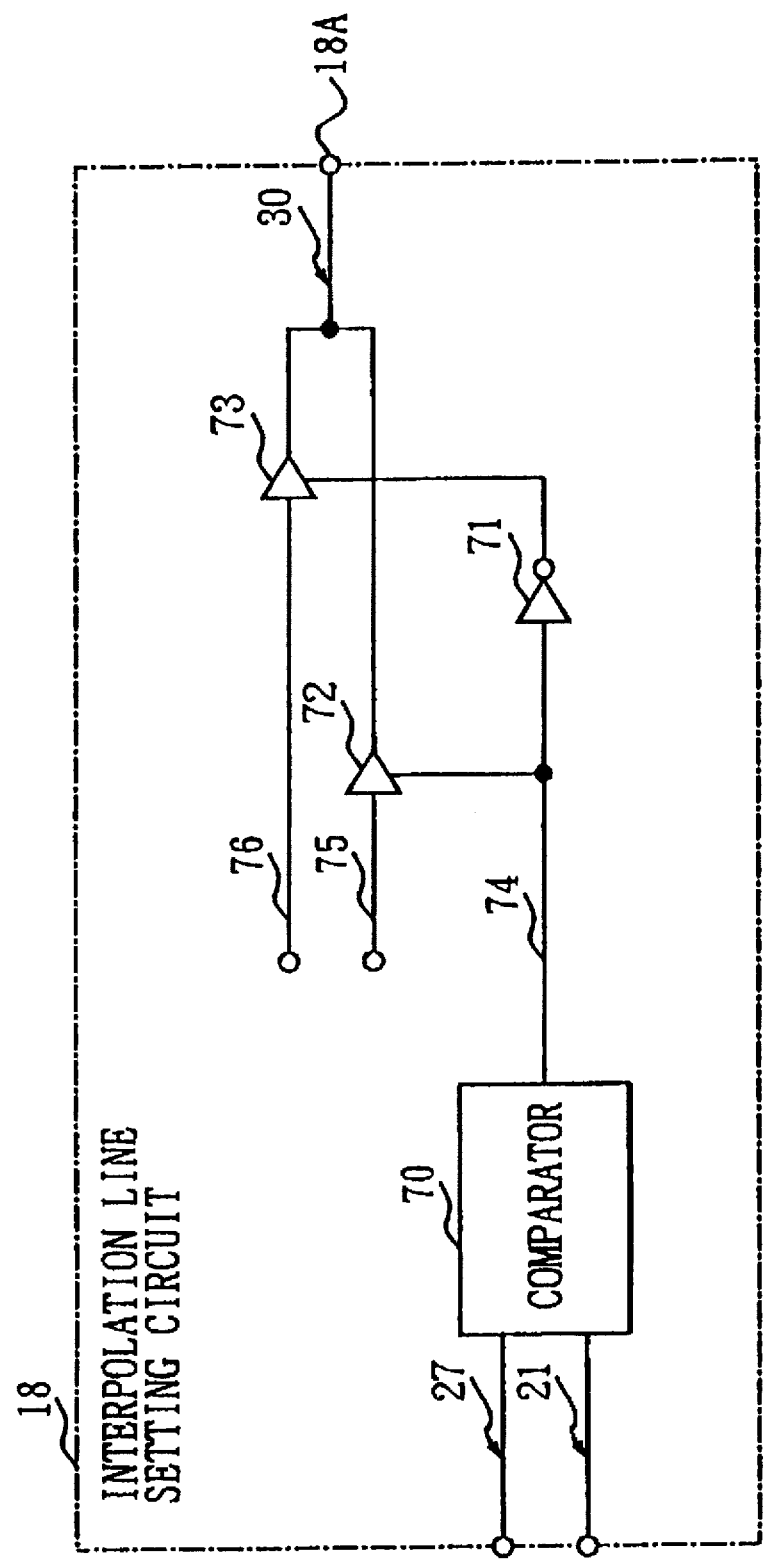
FIG. 7 is a block diagram of another interpolation line setting circuit.

FIG. 7 is a block diagram of the second interpolation line setting circuit 18. The second interpolation line setting circuit 18 comprises a comparator 70, a logic element 71 and three-state buffer gates 72 and 73. The level difference 27 of the seventh line T is compared with the level difference 21 of the first line M in the comparator 70. When the level difference 27 of the seventh line T is smaller than the level difference 21 of the first line M, a high level signal is output to a signal line 74, and when the level difference 27 is not smaller than the level difference 21, a low level signal is output. The signal line 74 is connected to the logic element 71. When the input signal of the logic element 71 is the high level signal, the logic element 71 outputs a low level signal, and when the input signal is the low level signal, the logic element 71 outputs a high level signal. Consequently, only one of the buffer gates 72 and 73 becomes the active state without fail. Namely, when the signal line 74 has the high level signal, the buffer gate 72 becomes the active state, and the signal of the integer "3" transmitted through a signal line 75 is output as the second interpolation line 30. On the other hand, when the signal line 74 has the low level signal, the buffer gate 73 becomes the active state, and the signal of the integer "1" transmitted through a signal line 76 is output as the second interpolation line 30. The output terminals of the buffer gates 72 and 73 are connected into a wired-OR circuit, and the data of the second interpolation line 30 is output to a terminal 18A of the interpolation line setting circuit 18.

Figure 8:
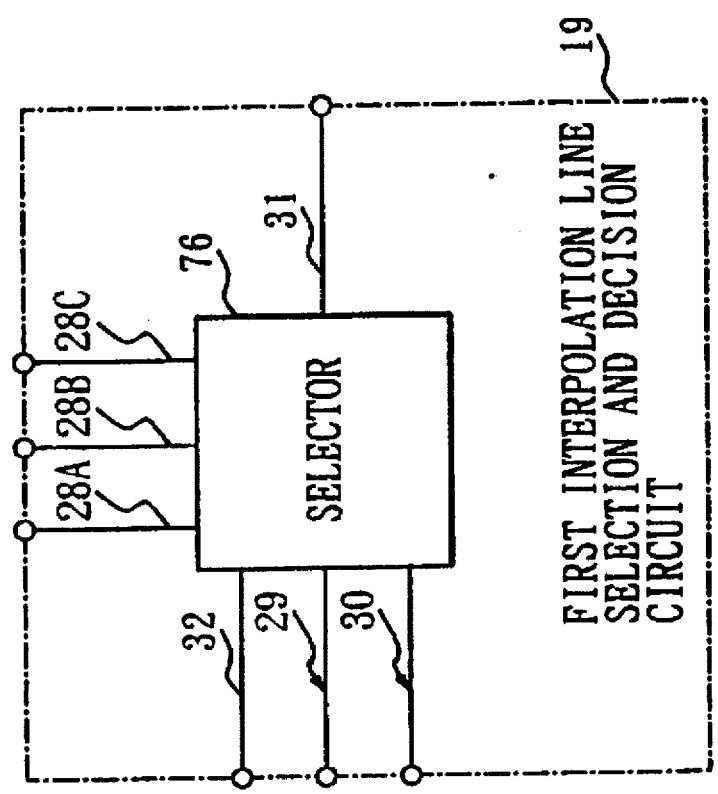
FIG. 8 is a block diagram of an interpolation line selection and decision circuit.

FIG. 8 is a block diagram of the first interpolation line selection and decision circuit 19. The first interpolation line selection and decision circuit 19 comprises a selector 76. A signal line 32 for inputting the signal of the integer "1" representing the first line M is connected to the selector 76, and when a selection line 28A has a high level signal, data of the first line M is output to a signal line 31 as the ultimate interpolation line. Moreover, in the selector 76, when a selection line 28B has a high level signal, the first interpolation line 29 is selected. On the other hand, when a selection line 28C has a high level signal, the second interpolation line 30 is selected. By the above-mentioned operation, the ultimate interpolation line is decided. The interpolation operation is carried out by using the pixels on the attained interpolation line, and thus the interpolation characteristic is improved.

Second Embodiment

Figure 9:
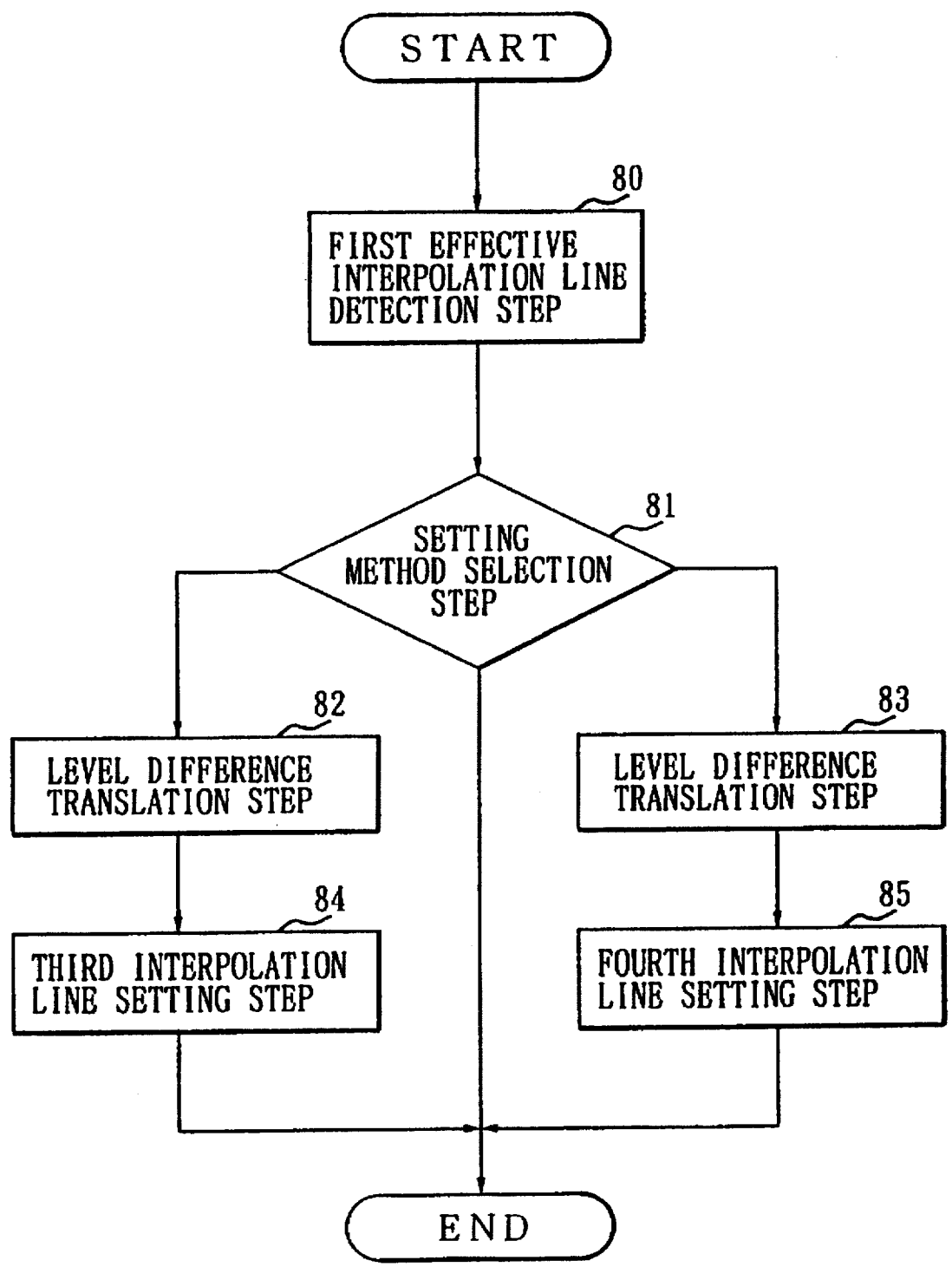
FIG. 9 is a flow chart of the process of a second interpolation line detection method in accordance with the present invention.
Figure 10:
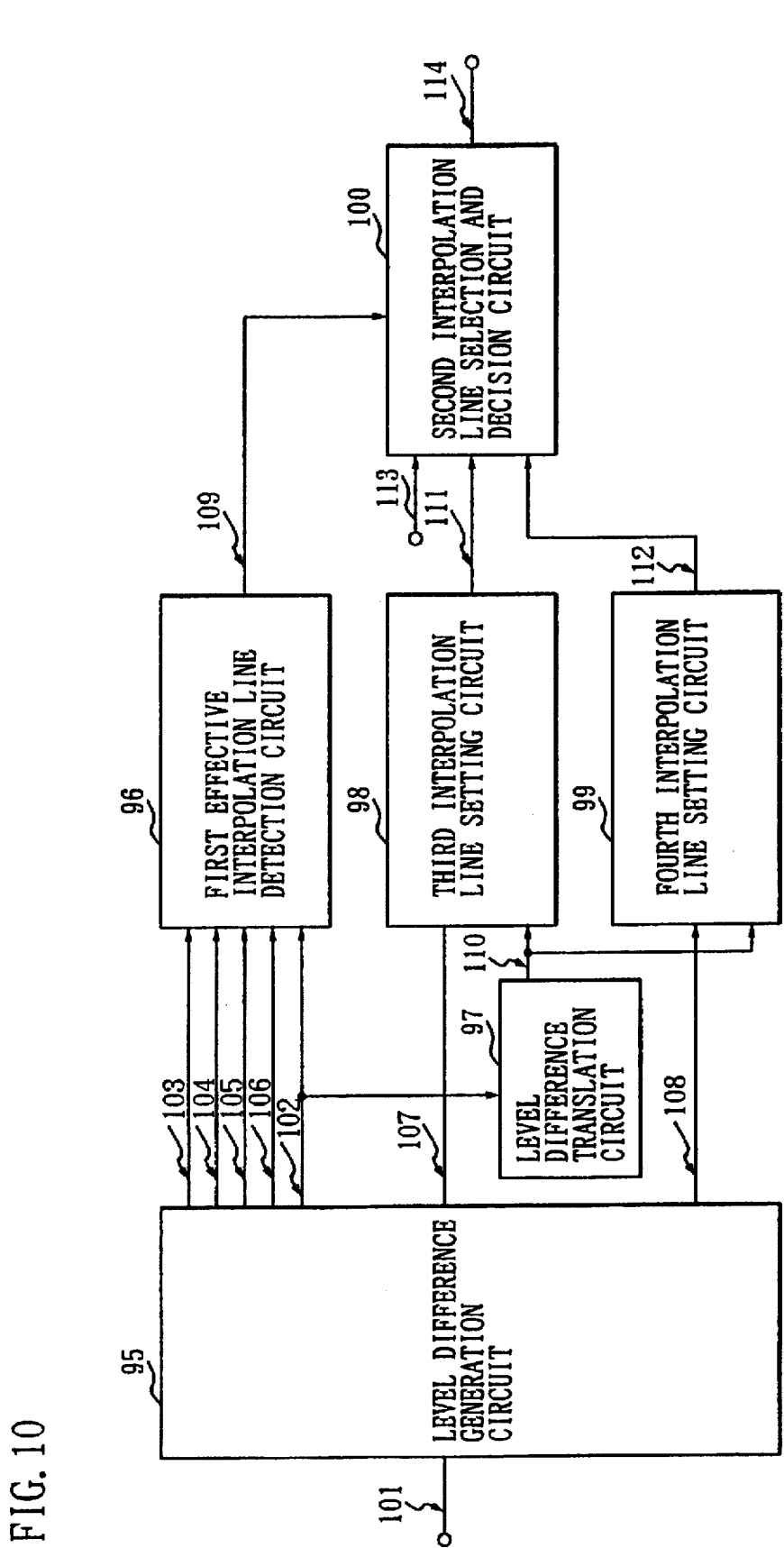
FIG. 10 is a block diagram of a second interpolation line detection apparatus in accordance with the present invention.

FIG. 9 is a flow chart representing a process of a second interpolation line detection method of the second embodiment in accordance with the present invention. FIG. 10 is a block diagram of a second interpolation line detection apparatus of the second embodiment. The second interpolation line detection method comprises a first effective interpolation line detection step 80, a setting method selection step 81, a level difference translation steps 82 and 83, a third interpolation line setting step 84 and a fourth interpolation line setting step 85.

In the second interpolation line detection method, the level difference translation steps 82 and 83 for translating the level difference of the first line M on the basis of a predetermined function are added to the first interpolation line detection method (FIG. 1). Moreover, the third interpolation line setting step 84 and the fourth interpolation line setting step 85 are attached as replacements for the first interpolation line setting step 12 and the second interpolation line setting step 13, respectively. The process for translating the level difference by these level difference translation steps 82 and 83 is described with reference to FIG. 11, FIG. 12A and FIG. 12B.

Figure 11:
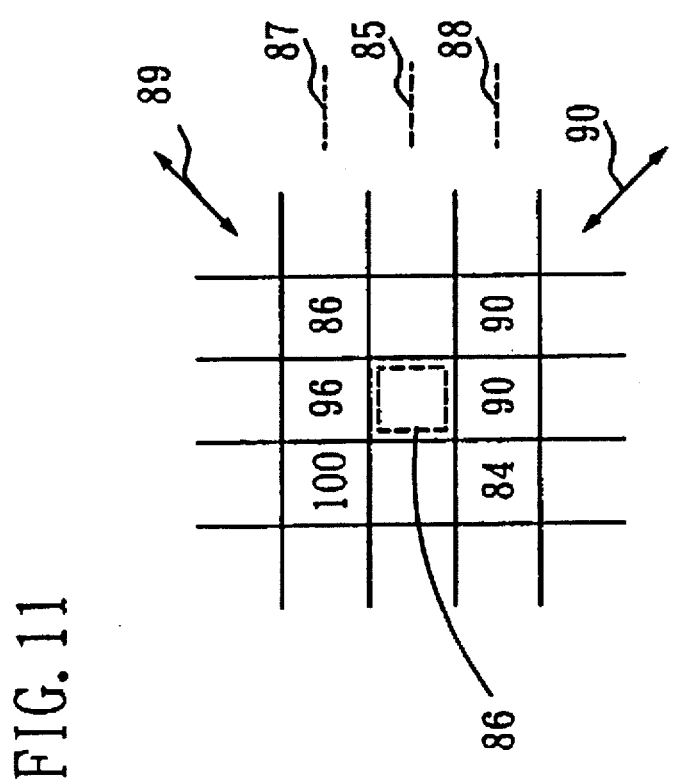
FIG. 11 is a diagram illustrating a level difference translation processing.

Boxes in FIG. 11 represent pixels, and a numeral value in each box represents a luminance level of the pixel. In FIG. 11, the largest luminance level is represented by a numeral value "255" (not shown) and the smallest luminance level is represented by a numeral value "0" (not shown) (hereinafter, description is made under the same condition as that mentioned above). A pixel 86 on a scanning line 85 to be interpolated (corresponding to the line Y in FIG. 2A) is the attentional pixel to be interpolated. First, the first interpolation line detection method is applied to generate the attentional pixel 86 by pixels on an upper scanning line 87 (corresponding to line X in FIG. 2A) and a lower scanning line 88 (corresponding to line Z in FIG. 2A) of an inputted field. Consequently, an interpolation line in the direction from upper right to lower left is selected. A luminance level is derived from an average value, and the value of the luminance level of the attentional pixel 86 becomes "85". Namely, it is determined that there is an image continuing in the direction of an arrow 89. On the other hand, in the case that the difference of the luminance levels is small with respect to all pixels, the selection of the interpolation line is liable to be influenced by noise contained in the input image. Therefore, there is a possibility that the direction shown by an arrow 90 is a correct direction of interpolation. Moreover, in the case of the small difference of the luminance levels as mentioned above, even if a simple linear interpolation (interpolation operation in the vertical direction) is applied influence to the image quality is slight. In the case that the difference of luminance levels is small with respect to all pixels, the interpolation operation in the vertical direction can be escaped from the influence of noise and thereby a good result is obtainable, rather than the above-mentioned interpolation operation. Therefore, in FIG. 2A, after investigation of the level difference of the first line M, in the case that the level difference is small, the level difference is translated on the basis of a predetermined function (hereinafter is referred to as level difference translation function) so that a linear interpolation is carried out. In this operation, it is desirable that the function maintains continuity in the vicinity of the level difference for deciding translation or non-translation on the basis of the above-mentioned predetermined function.

Figure 12A:
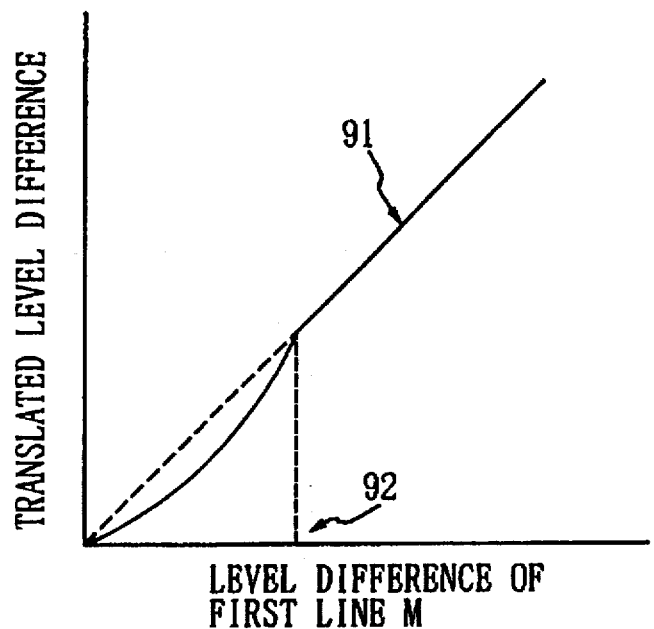
FIG. 12A and FIG. 12B are diagrams illustrating the level difference translation processing.
Figure 12B:
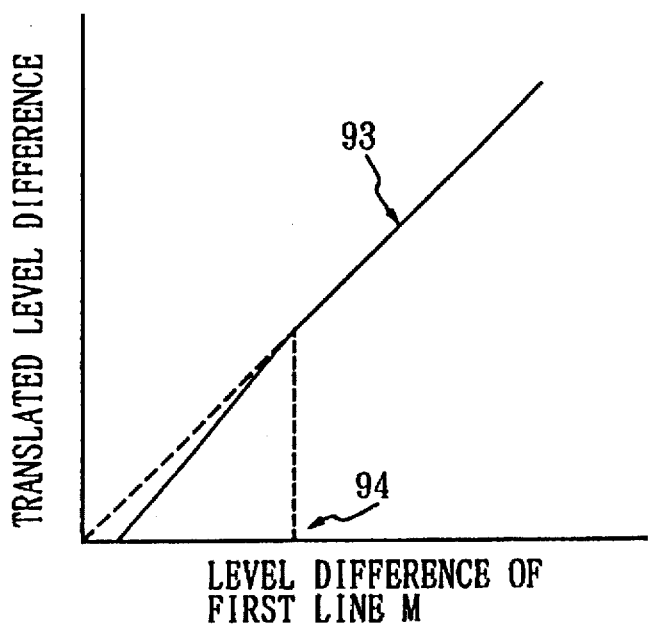

FIG. 12A and FIG. 12B are diagrams illustrating examples of the level difference translation functions. Abscissas in FIG. 12A and FIG. 12B designate level differences of the first line M to be inputted, and ordinates designate translated level differences. In FIG. 12A, a solid line 91 represents the level difference translation function. When the inputted level difference is a predetermined threshold value 92 and below, a translated level difference becomes a value of the inputted level difference and below. When the inputted level difference is larger than the threshold value 92, the same level difference as the inputted level difference is attained. Consequently, there is a high probability that the first line M becomes the ultimate interpolation line. FIG. 12B represents another level difference translation function formed by a bent line. Referring to FIG. 12B, a bent solid line 93 represents the level difference translation function. When the inputted level difference is a threshold value 94 and below, a converted level difference becomes the inputted level difference and below. When the inputted level difference is larger than the threshold value 94, the same level difference as the inputted level difference is attained. In general, a continuous function of which the converted level difference becomes the level difference of the first line M and below in a range of a predetermined threshold value and below is usable for the level difference translation function.

Subsequently, the process of the second interpolation line detection method is described with reference to FIG. 9. The process is basically similar to that in the first embodiment, and thus a detailed description is omitted.

First, at the first effective interpolation line detection step 80, a line having a smallest level difference is detected from the level differences of the first line M—the fifth line R, and a pattern is determined from three patterns. Then, at the setting method selection step 81, the level difference translation step 82 is selected in the case that the first effective interpolation line information represents the second pattern. At the level difference translation step 82, the level difference of the first line M is translated by using the level difference translation function as shown by FIG. 12A or FIG. 12B. Moreover, at the third interpolation line setting step 84, the translated level difference of the first line M is compared with the level difference of the sixth line S. Then, when the level difference of the sixth line S is smaller than the translated level difference of the first line M, the sixth line S is set as the ultimate interpolation line. In the case that the sixth line S is not set as the ultimate interpolation line, the first line M is set as the ultimate interpolation line.

In the case that the first effective interpolation line information represents the third pattern, the flow advances from the setting method selection step 81 to the level difference translation step 83, and the level difference of the first line M is translated by a similar process to the level difference translation step 82. Subsequently, at the fourth interpolation line setting step 85, the translated level difference of the first line M is compared with the level difference of the seventh line T. When the level difference of the seventh line T is smaller than the translated level difference of the first line M, the seventh line T is set as the ultimate interpolation line, and in other cases, the first line M is set as the ultimate interpolation line. Moreover, at the setting method selection step 81, when the first effective interpolation information represents the first pattern, the first line M is set as the ultimate interpolation line. In the second embodiment, though the level difference translation steps 82 and 83 are arranged after the setting method selection step 81, the level difference translation steps 82 and 83 can be arranged before the setting method selection step 81.

The second interpolation line detection apparatus is described with reference to FIG. 2A, FIG. 2B, FIG. 2C and FIG. 10.

The second interpolation line detection apparatus is to realize the second interpolation line detection method as mentioned above, and comprises a level difference generation circuit 95, a first effective interpolation line detection circuit 96, a level difference translation circuit 97, a third interpolation line setting circuit 98, a fourth interpolation line setting circuit 99 and a second interpolation line selection and decision circuit 100. The level difference generation circuit 95, the first effective interpolation line detection circuit 98, the third interpolation line setting circuit 96, the fourth interpolation line setting circuit 99 and the second interpolation line selection and decision circuit 100 in this embodiment correspond to the level difference generation circuit 15, the first effective interpolation line detection circuit 16, the first interpolation line setting circuit 17, the second interpolation line setting circuit 18 and the first interpolation line selection and decision circuit 19 in the first embodiment, respectively. Therefore, each circuit of the second interpolation line detection apparatus is configured by corresponding the same circuit as that in the first embodiment.

First, an input signal 101 is inputted to the level difference generation circuit 95. A level difference 102 of the first line M passing through the upper pixel C and the lower pixel F, a level difference 103 of the second line N passing through the upper pixel C and the lower left pixel E and a level difference 104 of the third line P passing through the upper pixel C and the lower right pixel G are generated in the level difference generation circuit 95. In a similar manner, a level difference 105 of the fourth line Q passing through the lower pixel F and the upper left pixel B, a level difference 106 of the fifth line R passing through the lower pixel F and the upper right pixel D, a level difference 107 of the sixth line S passing through the upper right pixel D and the lower left pixel E and a level difference 108 of the seventh line T passing through the upper left pixel B and the lower right pixel G are generated. Then, the level differences 102–106 of the first line M—the fifth line R generated by the level difference generation circuit 95 are applied to the first effective interpolation line detection circuit 96, and a line having a smallest level difference is detected. Moreover, in the first effective interpolation line detection circuit 96, the case that the level differences 103 of the second line N or the level difference 106 of the fifth line R is smaller than the level differences of other lines is classified into the second pattern. The case that the level difference 104 of the third line P or the level difference 105 of the fourth line Q is smaller than the level differences of other lines is classified into the third pattern. Moreover, the case which is not the second pattern nor the third pattern is classified into the first pattern. Consequently, first effective interpolation line information 109 corresponding to one of these patterns is applied to the second interpolation line., selection and decision circuit 100.

On the other hand, the level difference 102 of the first line M generated by the level difference generation circuit 95 is also applied to the level difference translation circuit 97, and is translated on the basis of the predetermined function in the level difference translation process described with reference to FIG. 11, FIG. 12A and FIG. 12B. A translated level difference 110 of the first line M translated by the level difference translation circuit 97 and the level difference 107 of the sixth line S are applied to the third interpolation line setting circuit 98. The translated level difference 110 of the first line M is compared with the level difference 107 of the sixth line S in the interpolation line setting circuit 98, and when the level difference 107 of the sixth line S is smaller than the converted level difference 110, the sixth line S is set as a third interpolation line 111. Moreover, when the level difference 107 of the sixth line S is the converted level difference 110 or more, the first line M is set as the third interpolation line 111.

Moreover, the translated level difference 110 of the first line M and the level difference 108 of the seventh line T are applied to the fourth interpolation line setting circuit 99. The translated level difference 110 is compared with the level difference 108 of the seventh line T in the fourth interpolation line setting circuit 99, and when the level difference 108 of the seventh line T is smaller than the translated level difference 110, the seventh line T is set as a fourth interpolation line 112. Moreover, when the level difference 108 of the seventh line T is the translated level difference 110 or more, the first line M is set as the fourth interpolation line 112.

In the second interpolation line selection and decision circuit 100, one of the third interpolation line 111 output from the third interpolation line setting circuit 98, the fourth interpolation line 112 output from the fourth interpolation line setting circuit 99 and the first line M inputted through a signal line 113 is selected on the basis of the first effective interpolation line information 109 having three patterns and output from the first effective interpolation line detection circuit 96. Consequently, a selected line is decided to an ultimate interpolation line 114 and is output. Namely, in this interpolation line selection and decision circuit 100, in the case that the first effective interpolation line information 109 represents the second pattern, the third interpolation line 111 is decided to the ultimate interpolation line 114. In the case that the first effective interpolation line information 109 represents the third pattern, the fourth interpolation line 112 is decided to the ultimate interpolation line 114. Moreover, in the case that the first effective interpolation line information 109 represents the first pattern, the first line M is decided to the ultimate interpolation line 114.

Figure 13:
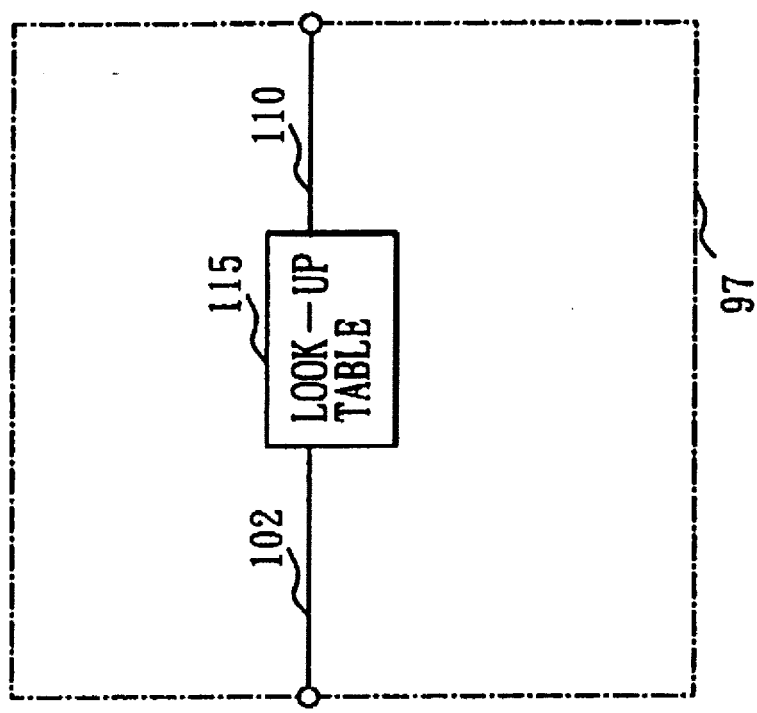
FIG. 13 is a block diagram of a level difference translation circuit.

FIG. 13 is a block diagram of the level difference translation circuit 97. The level difference translation circuit 97 comprises a look-up table 115, and the inputted level difference 102 of the first line M is translated thereby, and the translated level difference 110 is output therefrom.

Third embodiment

Figure 14:
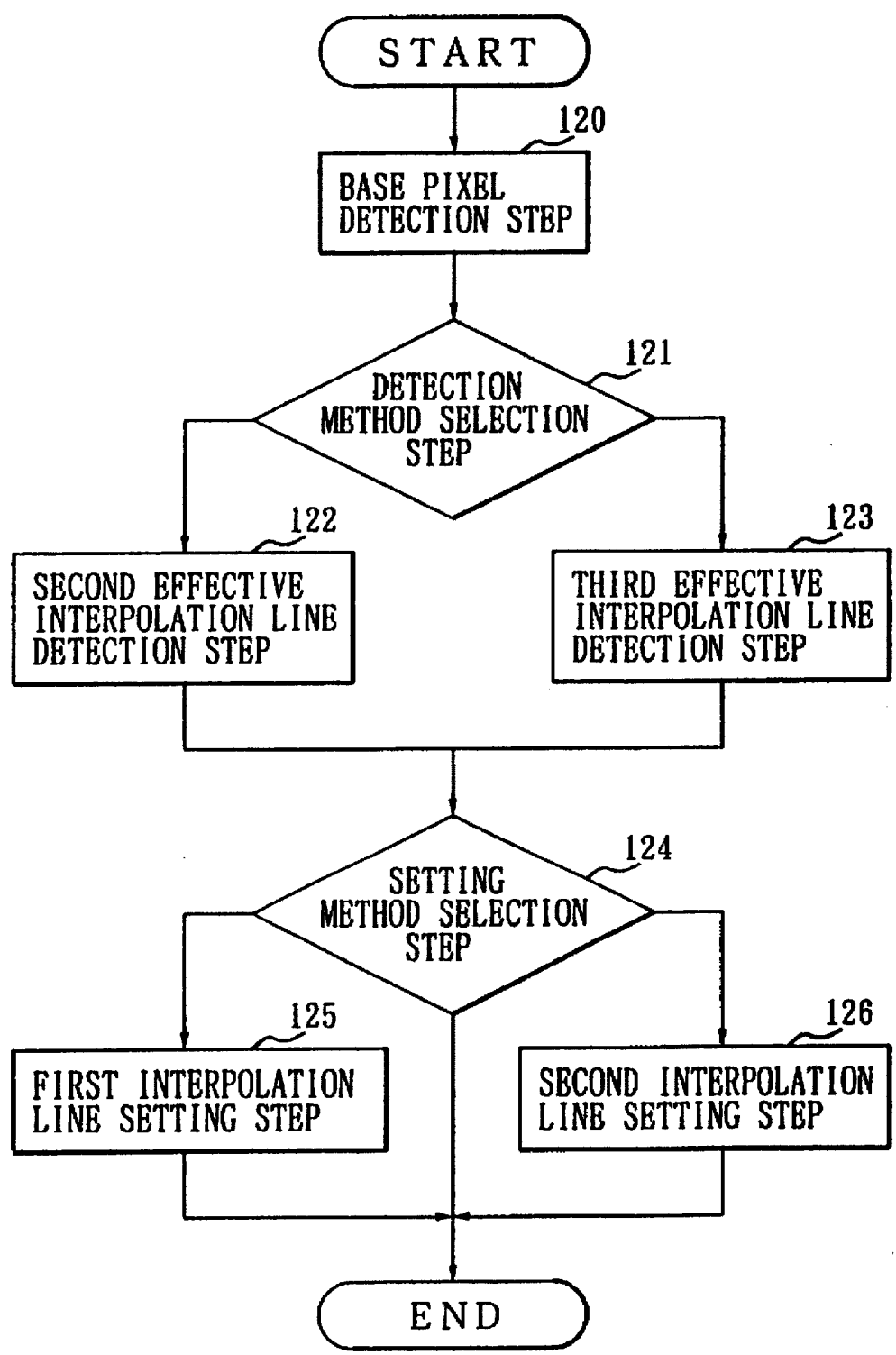
FIG. 14 is a flow chart of the process of a third interpolation line detection method in accordance with the present invention.
Figure 15:
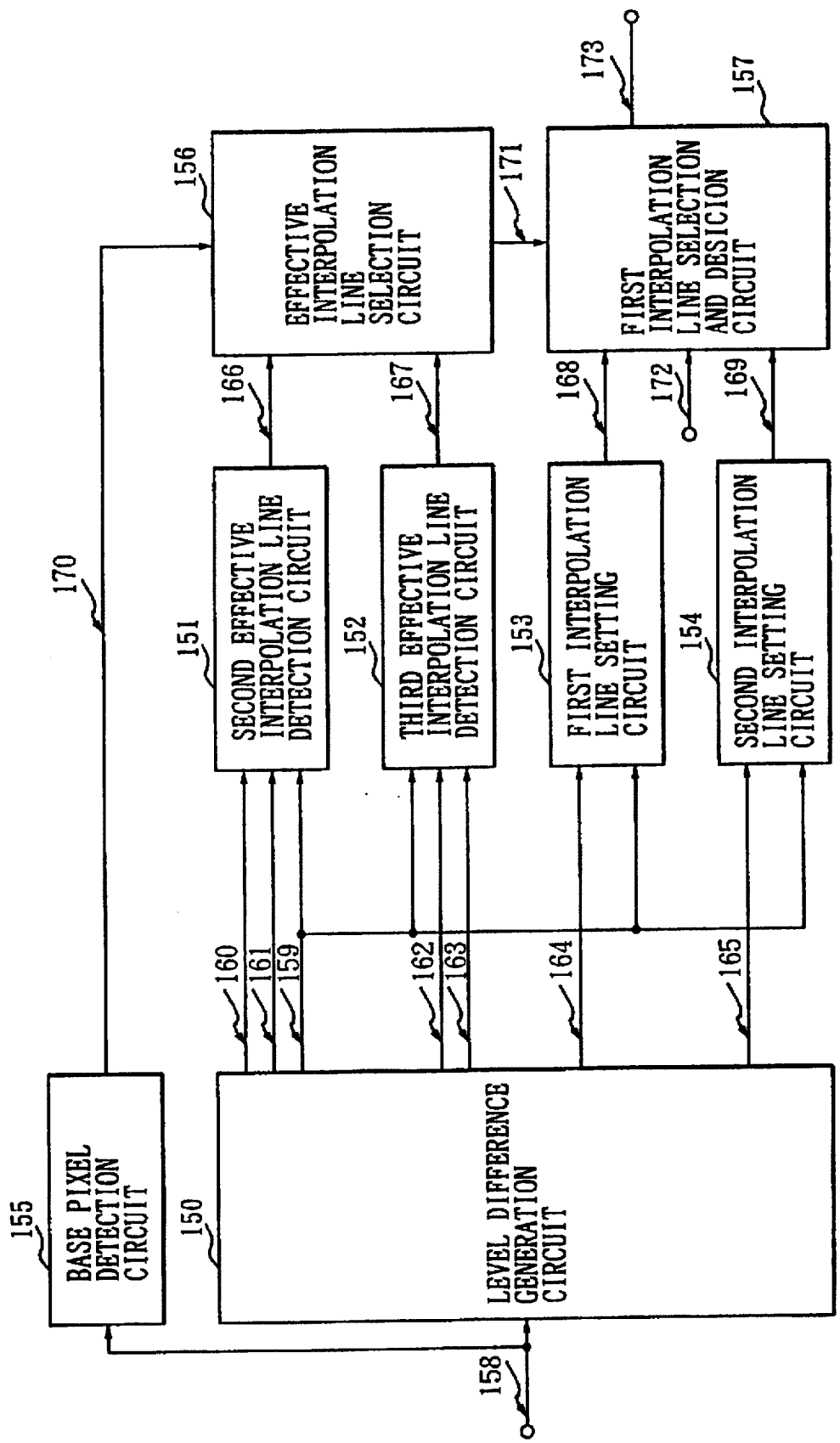
FIG. 15 is a block diagram of a third interpolation line detection apparatus in accordance with the present invention.

FIG. 14 is a flow chart of the process of a third interpolation line detection method of the third embodiment in accordance with the present invention. FIG. 15 is a block diagram of a third interpolation line decision apparatus of the third embodiment. The third interpolation line detection method of the third embodiment comprises a base pixel detection step 120, a detection method selection step 121, a second effective interpolation line detection step 122, a third effective interpolation line detection step 123, a setting method selection step 124, a first interpolation line setting step 125 and a second interpolation line setting step 126.

In the third interpolation line detection method, the base pixel detection step 120, the detection method selection step 121, the second and third effective interpolation line detection steps 122 and 123 are attached as replacement for the first effective interpolation line detection step 10 in the first interpolation line detection method (FIG. 1). Namely, in the first interpolation line detection method, the level differences of the first line M—the fifth line R are compared with each other. On the other hand, in the third interpolation line detection method, comparison operation by setting the upper pixel to the base pixel and comparison operation by setting the lower pixel to the base pixel are separately carried out. The process for detecting the interpolation line in the third embodiment is described with reference to FIG. 16 and FIG. 17.

Figure 16:
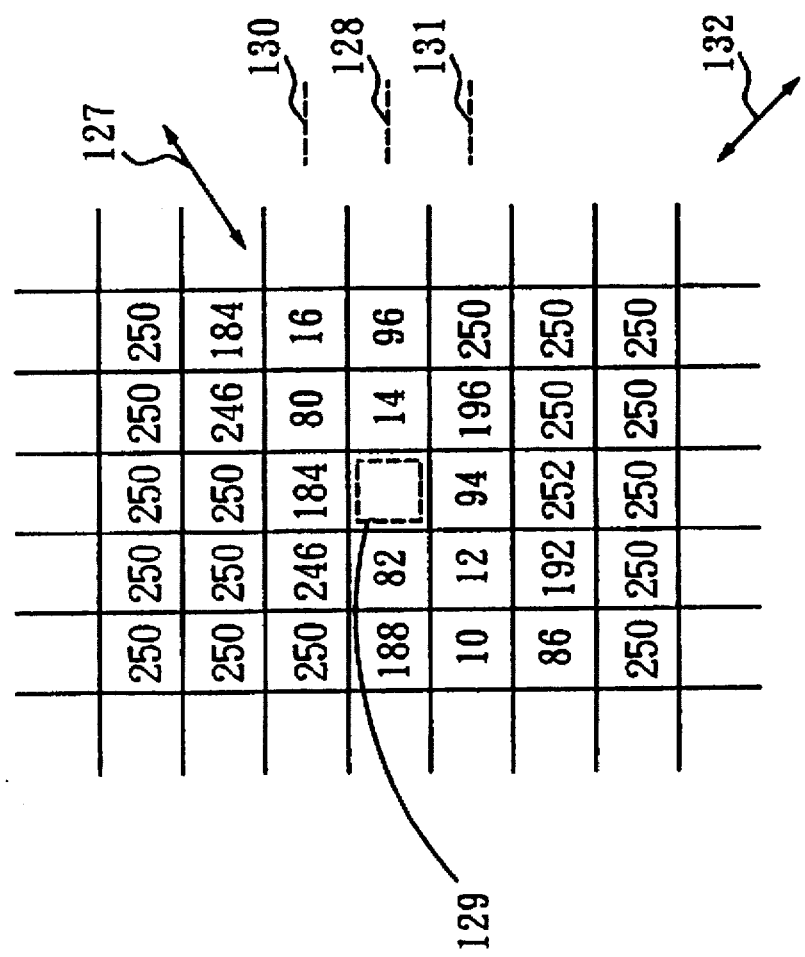
FIG. 16 is a diagram illustrating a level change detection processing.

First, boxes in FIG. 16 illustrate pixels, and a value in each box represents the luminance level of the pixel. In FIG. 16, an image having a fine line in the direction of an arrow 127 is displayed by pixels having low luminance levels. Data of the luminance levels of the pixels in a frame image are written in the boxes except for an attentional pixel 129 on a scanning line 128 to be interpolated (corresponding to line Y in FIG. 2A). In the case that the first interpolation line detection method is applied to generate the attentional pixel 129 from the data of an inputted upper scanning line 130 (corresponding to line X in FIG. 2A) and a lower scanning line 131 (corresponding to line Z in FIG. 2A), the seventh line T along an arrow 132 is selected. Consequently, the luminance level of the attentional pixel 129 becomes the value "221", and thus it is determined that the image is continuous in the direction of the arrow 132. Namely, according to the first interpolation line detection method, since the entire level differences of the first line M—the fifth line R are simultaneously compared with each other, an erroneous determination arises.

Figure 17:
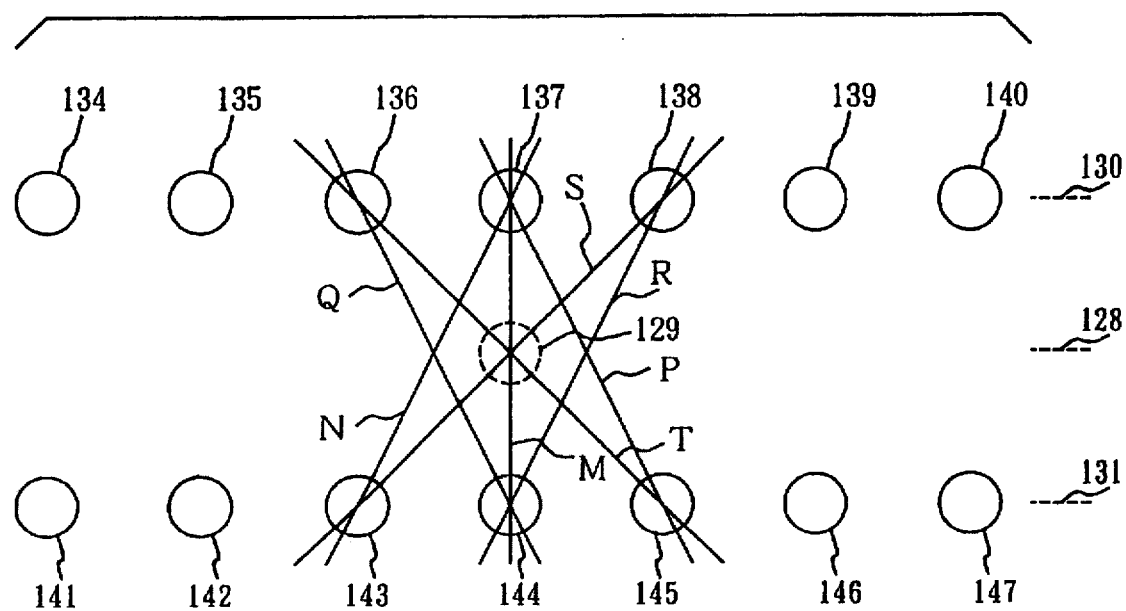
FIG. 17 is a diagram illustrating the level change detection processing.

On the contrary, at the base pixel detection step 120 in the third embodiment, as shown in FIG. 17, level changes of pixels 134–140 placed on the line 130 and level changes of pixels 141–147 placed on the line 131 in the vicinity of the attentional pixel 129 on the line 128 are investigated. Namely, at the base pixel detection step 120, an upper change level is defined by a sum of a level difference between the upper pixel 137 and a pixel 136 placed to the left of the upper pixel 137 with a predetermined interval, for example one pixel, and a level difference between the upper pixel 137 and a pixel 138 placed to the right of the upper pixel 137 with a predetermined interval, for example one pixel. In a similar manner, a lower change level is defined by a sum of a level difference between the lower pixel 144 and a pixel 143 placed to the left of the lower pixel 144 with a predetermined interval and a level difference between the lower pixel 144 and a pixel 145 placed to the right of the lower pixel 144 with a predetermined interval. In the case that the upper change level is larger than the lower change level, base pixel information of which the upper pixel 137 is the base pixel is output. On the other hand in the case that the lower change level is larger than the upper change level, base pixel information of which the lower pixel 144 is the base pixel is output. In the case that an input image having a low resolution is interpolated, it is preferable that the upper change level and the lower change level are derived by using the pixels 134, 137, 140, 141, 144 and 147.

Consequently, the upper change level in the example shown in FIG. 16 becomes the value "166", and the lower change level becomes the value "184". Moreover, at the base pixel detection step 120, the upper change level is compared with the lower change level. In the case that the upper change level is larger than the lower change level, base pixel information of which the upper pixel 137 is the base pixel is output. On the other hand, in the case that the lower change level is larger than the upper change level, base pixel information of which the lower pixel 144 is the base pixel is output. Consequently, in the example shown in FIG. 16, the lower pixel becomes the base pixel, and the base pixel information of which the lower pixel is the base pixel is output.

At the detection method selection step 121, in the case that the upper pixel 137 is the base pixel, the second effective interpolation line detection step 122 is selected on the basis of the base pixel information from the base pixel detection step 120. Moreover, in the case that the lower pixel 144 is the base pixel, the third effective interpolation line detection step 123 is selected on the basis of the base pixel information from the base pixel detection step 120. At the second effective interpolation line detection step 122, the level difference of the first line M passing through the upper pixel 137 and the lower pixel 144 (level difference between upper pixel 137 and lower pixel 144), the level difference of the second line N passing through the upper pixel 137 and the lower left pixel 143 (level difference between upper pixel 137 and lower left pixel 145) and the level difference of the third line P passing through the upper pixel 137 and the lower right pixel 145 (level difference between upper pixel 137 and lower right pixel 145) are compared with each other. Then a line having a smallest level difference is detected, and the second effective interpolation line information is generated. Moreover, at the second effective interpolation line detection step 122, the case that the level difference of the second line N is smallest and the level differences of the first line M and the second line P are not smallest is classified into the second pattern. Moreover, the case that the level difference of the third line P is smallest and the level differences of the first line M and the second line N are not smallest is classified into the third pattern. The case which is not the second pattern nor the third pattern is classified into the first pattern.

On the other hand, at the third effective interpolation line detection step 123, the lower pixel 144 is set as the base pixel and level differences are compared with each other as described below. Namely, the level difference of the first line M, the level difference of the fourth line Q passing through the lower pixel 144 and the upper left pixel 136, the level difference of the fifth line R passing through the lower pixel 144 and the upper right pixel 138 are compared with each other. The case that the level difference of the fifth line R is smaller than the level differences of other lines is classified into the second pattern. Moreover, the case that the level difference of the fourth line Q is smaller then the level differences of other lines is classified into the third pattern. The case which is not the second pattern nor the third pattern is classified into the first pattern.

At the setting method selection step 124, the first interpolation line setting step 125 and the second interpolation line setting step 126, a similar processing to the first embodiment is performed. Namely, since the lower pixel 144 is the base pixel in the case of FIG. 16, the flow advances to the third effective interpolation line detection step 123, and the level differences of the first line M, the fourth line Q and the fifth line R are compared with each other. Since the level difference of the fifth line R becomes smallest, the flow advances to the first interpolation line setting step 124, and the level difference of the first line M is compared with the level difference of the sixth line S. Consequently, Since the level difference of the sixth line R is smaller than the level difference of the first line M, the sixth line S becomes the ultimate interpolation line. In this operation, the luminance level of the attentional pixel 129 becomes the value "46", and a continuous image in the direction of the arrow 127 is realized.

Hereafter, operation of the third interpolation line detection apparatus in FIG. 15 is described with reference to FIG. 17. The above-mentioned third interpolation line detection method is performed by the third interpolation line detection apparatus.

The third interpolation line detection apparatus comprises a level difference generation circuit 150, a second effective interpolation line detection circuit 151, a third effective interpolation line detection circuit 152, a first interpolation line setting circuit 153, a second interpolation line setting circuit 154, a base pixel detection circuit 155, an effective interpolation line selection circuit 156 and a first interpolation line selection and decision circuit 157. The third interpolation line detection apparatus comprises the base pixel detection circuit 155, the second and third effective interpolation line detection circuits 151 and 152 and the effective interpolation line selection circuit 156 as replacement for the first effective interpolation line detection circuit 16 of the first interpolation line detection apparatus in FIG. 3. The level difference generation circuit 150, the first and second interpolation line setting circuits 153 and 154 and the first interpolation line selection and decision circuit 157 are realizable by similar circuits to the level difference generation circuit 15, the first and second interpolation line setting circuits 17 and 18 and the first interpolation line selection and decision circuit 19 of the first interpolation line detection apparatus, respectively.

An input signal 158 is inputted to the level difference generation circuit 150. In the level difference generation circuit 150, as shown in FIG. 17, a level difference 159 of the first line M passing through the upper pixel 137 placed just above the attentional pixel 129 to be interpolated and the lower pixel 144 placed just under the attentional pixel 129 is generated. In a similar manner, a level difference 160 of the second line N passing through the upper pixel 137 and the lower left pixel 143, a level difference 161 of the third line passing through the upper pixel 137 and the lower right pixel 145 and a level difference 162 of the fourth line Q passing through the lower pixel 144 and upper left pixel 136 are generated. Moreover, a level difference 163 of the fifth line R passing through the lower pixel 144 and the upper right pixel 138, a level difference 164 of the sixth line S passing through the upper right pixel 138 and the lower left pixel 143 and a level difference 165 of the seventh line T passing through the upper left pixel 136 and the lower right pixel 145 are generated. Subsequently, the level difference 159 of the first line M, the level difference 160 of the second line N and the level difference 161 of the third line P generated by the level difference generation circuit 150 are applied to the second effective interpolation line detection circuit 151. Then, a line having a smallest level difference is detected by the second effective interpolation line detection circuit 151. The number of the lines having the smallest level difference is not limited to one. Furthermore, in the second effective interpolation line detection circuit 151, the state that the level difference 160 of the second line N is smaller than the level difference 159 of the first line M and the level difference 161 of the third line P is classified into the second pattern. Moreover, the state that the level difference 161 of the third line P is smaller than the level difference 159 of the first line M and the level difference 160 of the second line N is classified into the third pattern. The case which is not the second pattern nor the third pattern is classified into the first pattern. Second effective interpolation line information 166 corresponding to one of the three patterns is applied to the effective interpolation line selection circuit 156.

The level difference 159 of the first line M, the level difference 162 of the fourth line Q and the level difference 163 of the fifth line R generated by the level difference generation circuit 150 are applied to the third effective interpolation line detection circuit 152. In the third effective interpolation line detection circuit 152, a line having a smallest level difference is detected. Then, in the third effective interpolation line detection circuit 152, the state that the level difference 163 of the fifth line R is smaller than the level differences of other lines is classified into the second pattern, and the state that the level difference 162 of the fourth line Q is smaller than the level differences of other lines is classified into the third pattern. Moreover, the state which is not the second pattern nor the third pattern is classified to the first pattern. Then, third effective interpolation line information 167 corresponding to one of the three patterns is applied to the effective interpolation line selection circuit 156.

The level difference 159 of the first line M and the level difference 164 of the sixth line generated by the level difference generation circuit 150 are applied to the first interpolation line setting circuit 153. In the first interpolation line setting circuit 153, the level difference 159 of the first line M is compared with the level difference 164 of the sixth line S, and when the level difference 164 of the sixth line S is smaller than the level difference 159 of the first line M, the sixth line S is set as a first interpolation line 168. On the other hand, when the level difference 164 of the sixth line S is the level difference 159 of the first line M or more, the first line M is set as a first interpolation line 168. Subsequently, the level difference 159 of the first line M and the level difference 165 of the seventh line T generated by the level difference generation circuit 150 are applied to the second interpolation line setting circuit 154. In the second interpolation line setting circuit 154, the level difference 159 of the first line M is compared with the level difference 165 of the seventh line T, and when the level difference 165 of the seventh line T is lower than the level difference 159 of the first line M, the seventh line T is set as a second interpolation line 169. Moreover, when the level difference 165 of the seventh line T is the level difference 159 of the first line M or more, the first line M is set as the second interpolation line 169.

The input signal 158 is also inputted to the base pixel detection circuit 155. In the base pixel detection circuit 155, the upper change level is compared with the lower change level in compliance with the process described with reference to FIG. 16 and FIG. 17, and base pixel information 170 is generated. The base pixel information 170 generated by the base pixel detection circuit 155 is applied to the effective interpolation line selection circuit 156. The base pixel information 170, the second effective interpolation line information 166 and the third effective interpolation line information 167 are applied to the effective interpolation line selection circuit 156. In the effective interpolation line selection circuit 156, one of the second effective interpolation line information 166 output from the second effective interpolation line detection circuit 151 and the third effective interpolation line information 167 output from the third effective interpolation line detection circuit 152 is selected on the basis of the base pixel information 170 output from the base pixel detection circuit 155, and fourth effective interpolation line information 171 is generated. The fourth effective interpolation line information 171 is applied to the first interpolation line selection and decision circuit 157.

Furthermore, data of the first interpolation line 168 output from the first interpolation line setting circuit 153, the second interpolation line 169 output from the second interpolation line setting circuit 154 and the first line M transmitted through a signal line 172 are inputted to the first interpolation line selection and decision circuit 157. In the interpolation line selection and decision circuit 157, in the case that the fourth effective interpolation line information 171 output from the effective interpolation line selection circuit 156 represents the second pattern, the first interpolation line 168 is decided to an ultimate interpolation line 173. In a similar manner, in the case of the third pattern, the second interpolation line 169 is decided to the ultimate interpolation line 173. On the other hand, in the case of the first pattern, the first line M is decided to the ultimate interpolation line 173.

Figure 18:
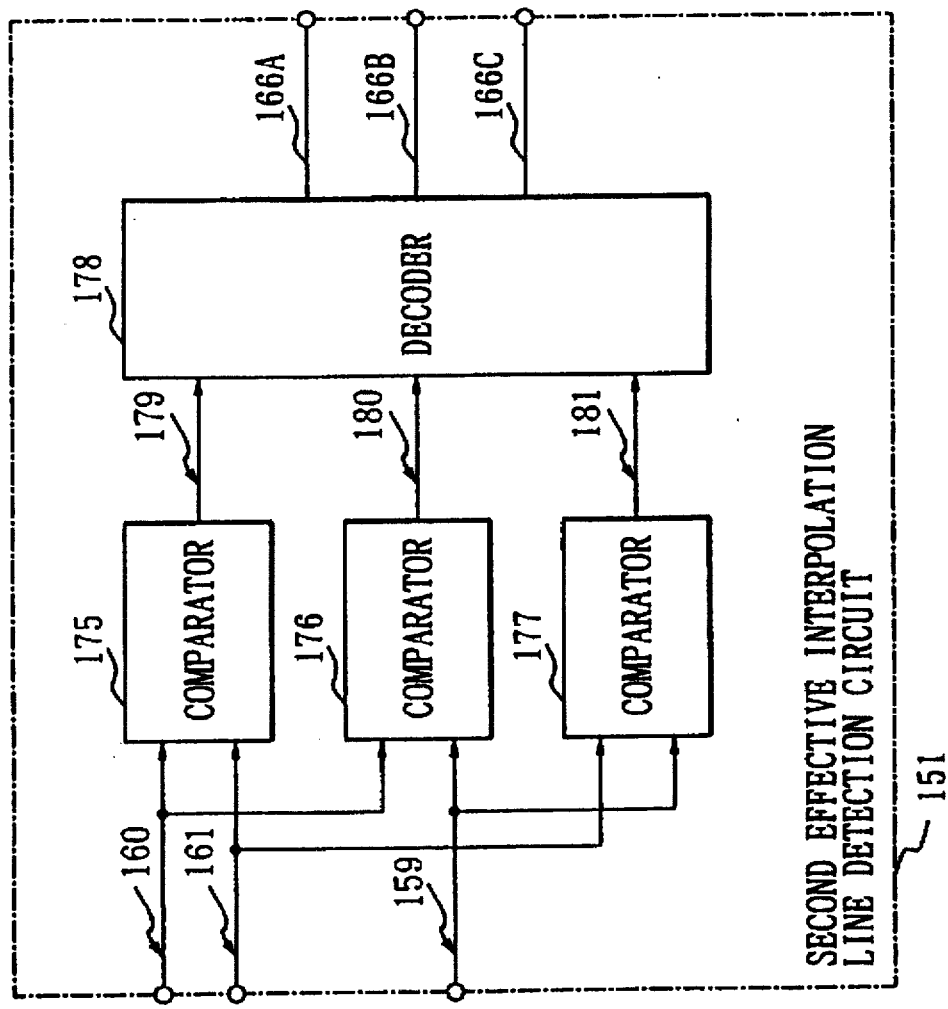
FIG. 18 is a block diagram of an effective interpolation line detection circuit.

FIG. 18 is a block diagram of the second effective interpolation line detection circuit 151. The effective interpolation line detection circuit 151 comprises comparators 175-177 and a decoder 178. In the second effective interpolation line detection circuit 151, the level difference 160 of the second line N output from the level difference generation circuit 150 in FIG. 15 is compared with the level difference 161 of the third line P by the comparator 175. A comparison result 179 is applied to the decoder 178. Moreover, the level difference 160 of the second line N is compared with the level difference 159 of the first line M by the comparator 176, and a comparison result 180 is applied to the decoder 178. The level difference 161 of the third line P is compared with the level difference 159 of the first line M by the comparator 177, and a comparison result 181 is applied to the decoder 178.

In the decoder 178, the case that the level difference 160 of the second line N is smaller than the level difference 159 of the first line M and the level difference 161 of the third line P is determined to the second pattern, and the case that the level difference 161 of the third line P is smaller than the level difference 159 of the first line M and the level difference 160 of the second line N is determined to the third pattern. The case which is not the second pattern nor the third pattern is determined to the first pattern. Then, in the case of the first pattern, a signal line 166A for outputting the second effective interpolation line information becomes a high level, and signal lines 166B and 166C become low levels. Moreover, in the case of the second pattern, the signal line 166B becomes the high level, and the signal lines 166A and 166C become the low levels. On the other hand, in the case of the third pattern, the signal line 166C becomes the high level, and the signal lines 166A and 166B become the low levels.

Figure 19:
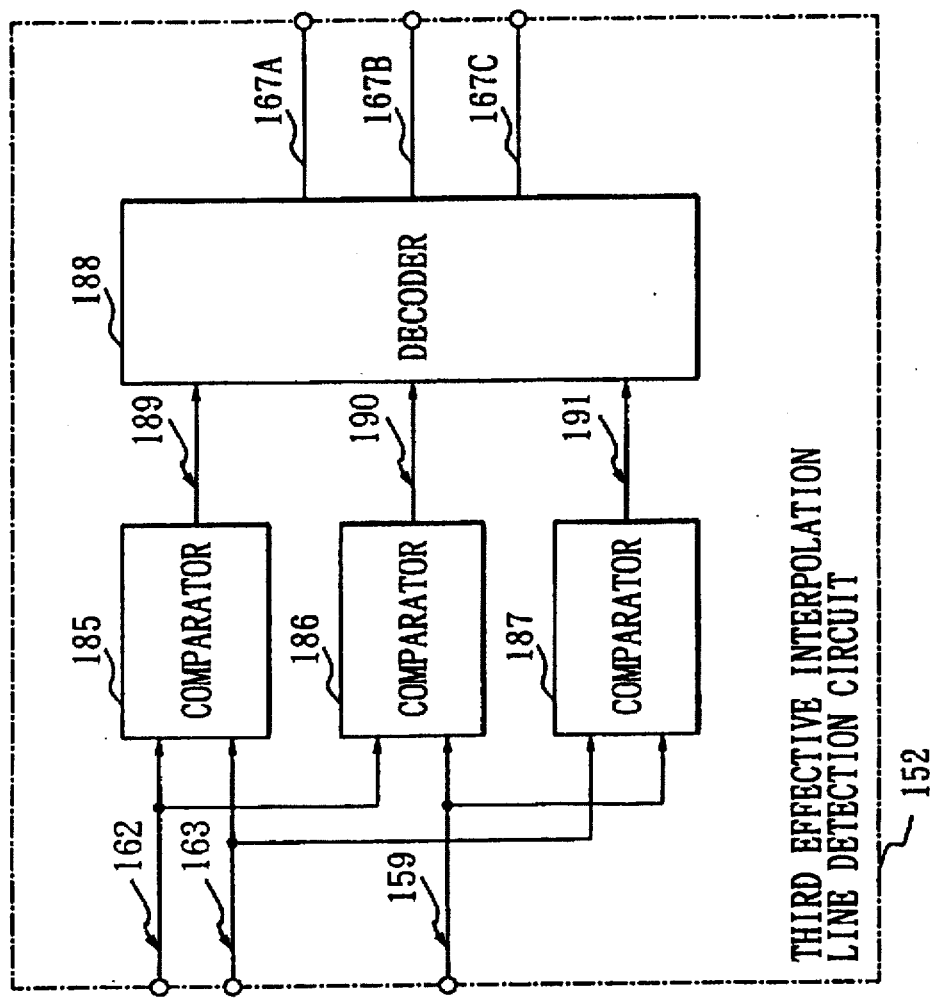
FIG. 19 is a block diagram of another effective interpolation line detection circuit.

FIG. 19 is a block diagram of the third effective interpolation line detection circuit 152. The effective interpolation line detection circuit 152 is similar to the second effective interpolation line detection circuit 151 and comprises comparators 185-187 and a decoder 188. Namely, in the third effective interpolation line detection circuit 152, the level difference 162 of the fourth line Q output from the level difference generation circuit 150 is compared with the level difference 163 of the fifth line R output from the level difference generation circuit 150 by the comparator 185, and a comparison result 189 is applied to the decoder 188. The level difference 162 of the fourth line Q is compared with the level difference 159 of the first line M by the comparator 186, and a comparison result 190 is applied to the decoder 188. The level difference 163 of the fifth line R is compared with the level difference of the first line M by the comparator 187, and a comparison result 191 is applied to the decoder 188.

Furthermore, in the decoder 188, the case that the level difference 162 of the fourth line Q is smaller than the level difference 159 of the first line M and the level difference 163 of the fifth line R is determined to the second pattern. Moreover, the case that the level difference 163 of the fifth line R is smaller than the level difference 159 of the first line M and the level difference 162 of the fourth line Q is determined to the third pattern, and the case which is not the second pattern nor the third pattern is determined to the first pattern. In the case of the first pattern, a signal line 167A for outputting the third effective interpolation line information becomes a high level, and signal lines 167B and 167C become low levels. Moreover, in the case of the second pattern, the signal line 167B becomes the high level, and the signal lines 167A and 167C become the low levels. In the case of the third pattern, the signal line 167C becomes the high level, and the signal lines 167A and 167B become the low levels.

Figure 20:
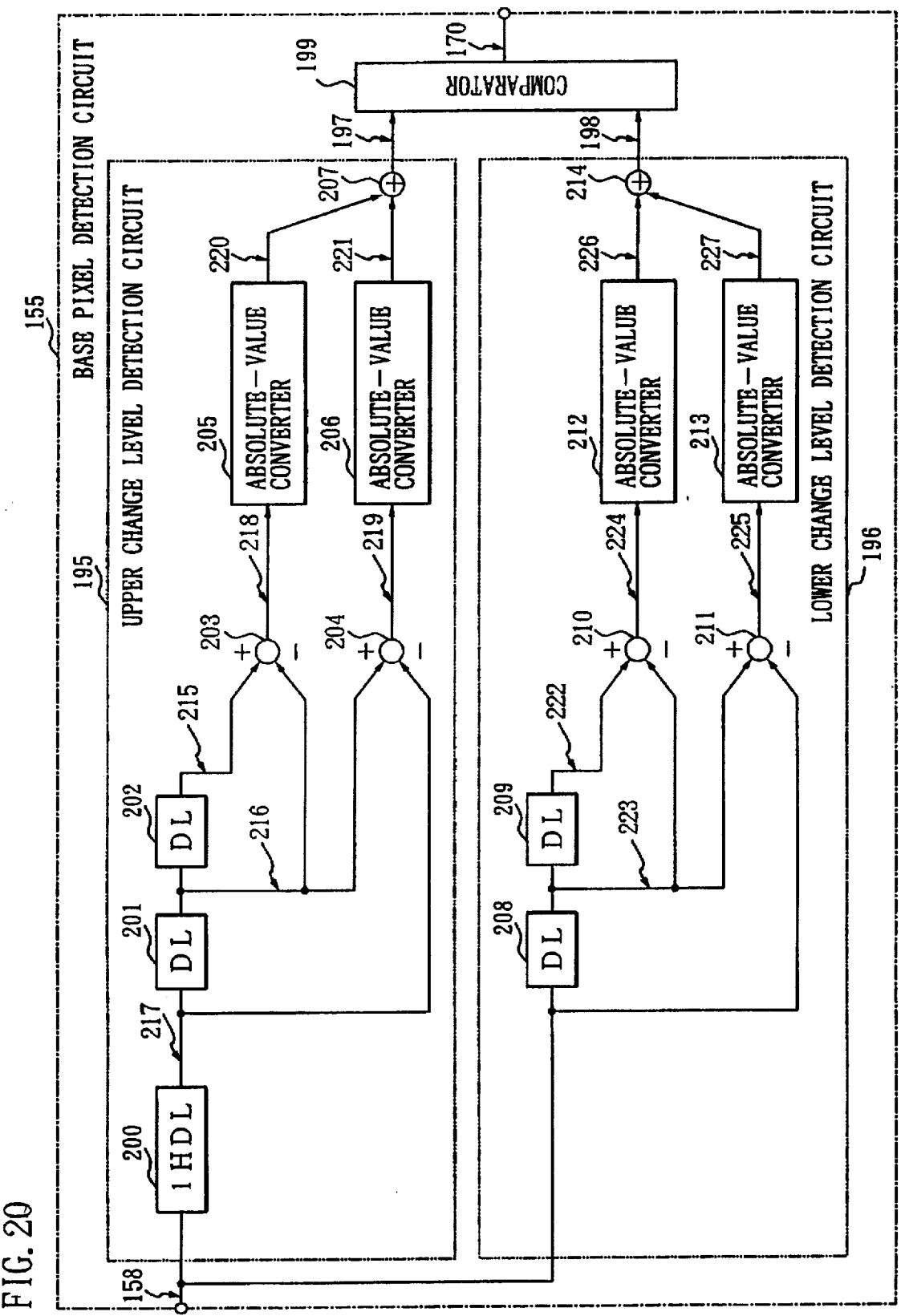
FIG. 20 is a block diagram of a base pixel detection circuit.

FIG. 20 is a block diagram of the base pixel detection circuit 155. The base pixel detection circuit 155 comprises an upper change level detection circuit 195 for detecting a level change of a pixel on the line 130, a lower change level detection circuit 196 for detecting a level change of a pixel on the line 131 in FIG. 17 and a change level comparison circuit 199 for comparing an upper change level 197 output from the upper change level detection circuit 195 with a lower change level 198 output from the lower change level detection circuit 196. The upper change level detection circuit 195 comprises a vertical delay circuit 200 for delaying a time period of one scanning line, delay circuits 201 and 202 for delaying of a time period of one pixel, subtraction circuits 203 and 204, absolute-value converters 205 and 206 for driving absolute values and an adder 207. The lower change level detection circuit 196 comprises delay circuits 208 and 209 for delaying of a time period of one pixel, subtraction circuits 210 and 211, absolute-value converters 212 and 213 for deriving absolute values and an adder 214. The change level comparison circuit 199 comprises a comparator.

In the base pixel detection circuit 155, a base pixel is detected by using the pixels 136, 137 and 138 on the line 130 and the pixels 143, 144 and 145 on the line 131 in FIG. 17. The pixels 136 and 138 located apart from the upper pixel 137 to the right or the left by one pixel and the pixels 143 and 145 located apart from the lower pixel 144 to the left or the right by one pixel are used in the base pixel detection circuit 155. In the above-mentioned change level detection process, pixels located further apart from the upper pixel or the lower pixel can be used to detect the level change.

In the upper change level detection circuit 195, a level change on the line 130 is detected, and the pixels 136-138 on the line 130 which are required to the base pixel detection processing can be simultaneously processed by delay operations of the vertical delay element 200 and the delay elements 201 and 202. The output signal 215 of the delay element 202 corresponds to the level of the upper left pixel 136, the output signal 216 of the delay element 201 corresponds to the level of the upper pixel 137 and the output signal 217 of the vertical delay element 200 corresponds to the level of the upper right pixel 138 in FIG. 17. Subsequently, in the subtraction circuit 203, the level 216 of the upper pixel 137 is subtracted from the level 215 of the upper left pixel 136, and the absolute value of a calculation result 218 is derived by the absolute-value converter 205. Furthermore, in the subtraction circuit 204, the level 217 of the upper right pixel 138 is subtracted from the level 216 of the upper pixel 137, and the absolute value of a calculation result 219 is derived by the absolute-value converter 206. Moreover, the sum of a level difference 220 output from the absolute-value converter 205 and a level difference 221 output from the absolute-value converter 206 is derived by the adder 207. The upper change level 197 is output from the adder 207 and is applied to the change level comparison circuit 199.

On the other hand, a level change on the line 131 is detected by the lower change level detection circuit 196, and the pixels 143-145 on the line 131 which are required to the base pixel detection processing are simultaneously processed by delay operation of the delay elements 208 and 209. In the above-mentioned process, the output signal 222 of the delay element 209 corresponds to the level of the lower left pixel 143, the output signal 223 of the delay element 208 corresponds to the level of the lower pixel 144 and the input signal 158 corresponds to the level of the lower right pixel 145 in FIG. 17. The level 223 of the lower pixel 144 is subtracted from the level 222 of the lower left pixel 143 in the subtraction circuit 210, and the absolute value of a calculation result 224 is derived by the absolute-value converter 212. Moreover, the level 158 of the lower right pixel 145 is subtracted from the level 223 of the lower pixel 144 in the subtraction circuit 211, and the absolute value of a calculation result 225 is derived by the absolute-value converter 213. The sum of a level difference 226 output from the absolute-value converter 212 and a level difference 227 output from the absolute-value converter 213 is derived by the adder 214. Consequently, the lower change level 198 is output from the adder 214 and is applied to the change level comparison circuit 199.

Moreover, in the change level comparison circuit 199 comprising a comparator, the upper change level 197 is compared with the lower change level 198. In the case that the upper change level 197 is larger than the lower change level 198, base pixel information 170 (for example, low level signal) of which the upper pixel 137 is the base pixel is output from the change level comparison circuit 199. Moreover, in other cases, the base pixel information 170 (for example, high level signal) of which the lower pixel 144 is the base pixel is output therefrom.

Figure 21:
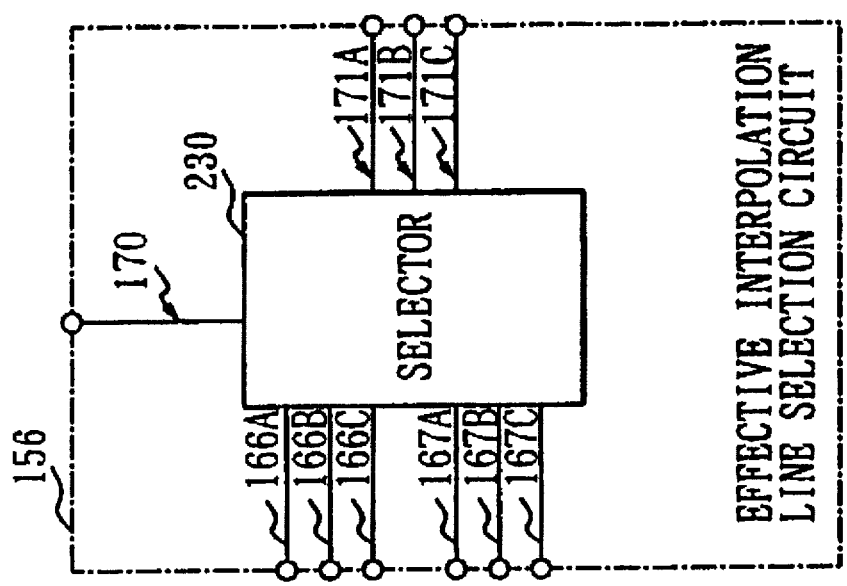
FIG. 21 is a block diagram of an effective interpolation line selection circuit.

FIG. 21 is a block diagram of the effective interpolation line selection circuit 156. The effective interpolation line selection circuit 156 comprises a selector 230. The second effective interpolation line information 166A, 166B and 166C output from the second effective interpolation line detection circuit 151, the third effective interpolation line information 167A, 167B and 167C output from the second effective interpolation line detection circuit 152 and the base pixel information 170 output from the change level comparison circuit 199 of the base pixel detection circuit 155 are inputted to the selector 230. In the selector 230, in the case that the upper pixel 137 is the base pixel, namely the base pixel information 170 is the low level signal, the second effective interpolation line information 166A, 166B and 166C are output as fourth effective interpolation line information 171A, 171B and 171C on the basis of the base pixel information 170, respectively. Moreover, in the case that the lower pixel 144 is the base pixel, namely the base pixel information 170 is the high level signal, the third effective interpolation line information 167A, 167B and 167C are output as the fourth effective interpolation line information 171A, 171B and 171C on the basis of the base pixel information 170, respectively.

Fourth embodiment

Figure 22:
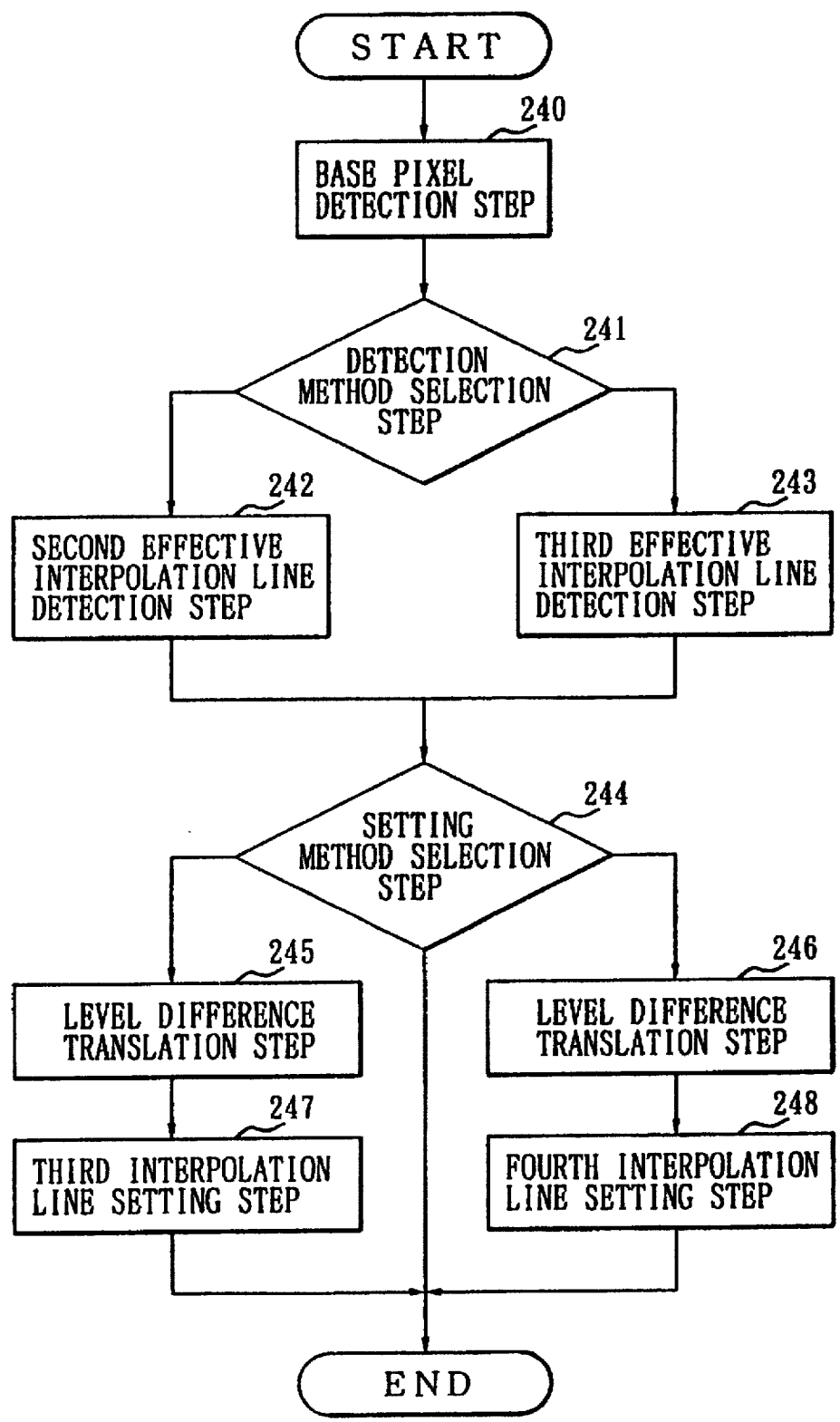
FIG. 22 is a flow chart of the process of a fourth interpolation line detection method in accordance with the present invention.
Figure 23:
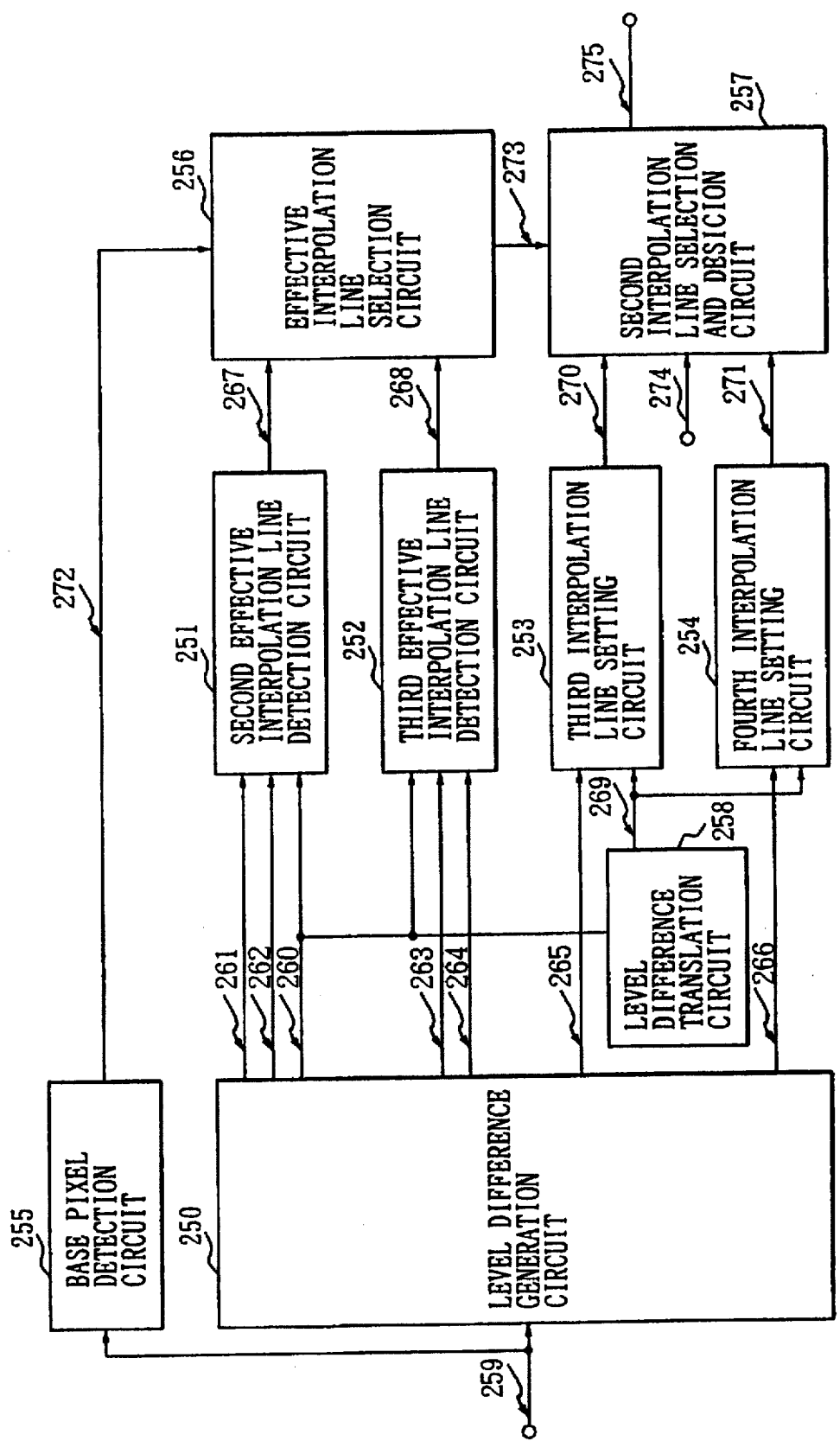
FIG. 23 is a block diagram of a fourth interpolation line detection apparatus in accordance with the present invention.

FIG. 22 is a flow chart of the process of the fourth interpolation line detection method of the fourth embodiment in accordance with the present invention. FIG. 23 is a block diagram of a fourth interpolation line detection apparatus. The fourth interpolation line detection method comprises a base pixel detection step 240, a detection method selection step 241, a second effective interpolation line detection step 242, a third effective interpolation line detection step 243, a setting method selection step 244, level difference translation steps 245 and 246, a third interpolation line setting step 247 and a fourth interpolation line setting step 248. In the fourth interpolation line detection method, the level difference translation steps 245 and 246 are added to the process of the third interpolation line detection method. The processing in the level difference translation steps 245 and 246 are similar to the processing in the second embodiment, and the description is omitted.

In the fourth interpolation line detection method, first, the change levels (upper change level) of the pixels 134-140 on the line 130 and the change levels (lower change level) of the pixels 141-147 on the line 131 in the vicinity of the attentional pixel 129 in FIG. 17 are detected at the base pixel detection step 240. Subsequently, the upper change level is compared with the lower change level. At the detection method selection step 241, when the upper change level is the lower change level or more, the second effective interpolation line detection step 242 is selected, and in other cases, the third effective interpolation line detection step 243 is selected on the basis of the base pixel information from the base pixel detection step 240. At the second and third effective interpolation line detection steps 242 and 243, a pattern is determined from the first—third patterns.

Moreover, at the setting method selection step 244, a successive processing is changed on the basis of the determined pattern.

In the case that the second pattern is output from the second effective interpolation line detection step 242 or the third effective interpolation line detection step 243, the flow advances to the level difference translation step 245. At the level difference translation step 245, the level difference of the first line M is translated on the basis of a predetermined function. Subsequently, at the third interpolation line step 247, the translated level difference of the first line M obtained by the level difference translation step 245 is compared with the level difference of the sixth line S, and the ultimate interpolation line is set. Furthermore, in the case that the third pattern is output from the second effective interpolation line detection step 242 or the third effective interpolation line detection step 243, the flow advances to the level difference translation step 246, and the level difference of the first line M is translated by a predetermined function. At the fourth interpolation line setting step 248, the translated level difference of the first line M is compared with the level difference of the seventh line T, and the ultimate interpolation line is set.

Moreover, at the setting method selection step 244, in the case that the first pattern is output from the second effective interpolation line detection step 242 or the third effective interpolation line detection 243, the first line M is set as the ultimate interpolation line. Incidentally, the level difference translation steps 245 and 246 can be performed before the setting method selection step 244 in the fourth embodiment. According to the fourth interpolation line detection method, the attentional pixel 129 can be interpolated by the ultimate interpolation line, and the break of the fine line in the image is reduced, and the influence of the noise is also reduced.

The fourth interpolation line detection apparatus is described with reference to FIG. 17 and FIG. 23. The fourth interpolation line detection apparatus is to realize the fourth interpolation line detection method, and comprises a level difference generation circuit 250, a second effective interpolation line detection circuit 251, a third effective interpolation line detection circuit 252, a third interpolation line setting circuit 253, a fourth interpolation line setting circuit 254, a base pixel detection circuit 255, an effective interpolation line selection circuit 256, a first interpolation line selection and decision circuit 257 and a level difference translation circuit 258. In the fourth interpolation line detection apparatus, the level difference translation circuit 258 is added to the third interpolation line detection apparatus.

An input signal 259 is applied to the level difference generation circuit 250. In the level difference generation circuit 250, a level difference 260 of the first line M passing through the upper pixel 137 and the lower pixel 144, a level difference 261 of the second line N passing through the upper pixel 137 and the lower left pixel 143, a level difference 262 of the third line P passing through the upper pixel 137 and the lower right pixel 145, a level difference 263 of the fourth line Q passing through the lower pixel 144 and the upper left pixel 136, a level difference 264 of the fifth line R passing through the lower pixel 144 and the upper right pixel 138, a level difference 265 of the sixth line S passing through the upper right pixel 138 and the lower left pixel 143 and a level difference 266 of the seventh line T passing through the upper left pixel 136 and the lower right pixel 145 are generated. The level differences 260, 261 and 262 of the first line M, second line N and third line P are applied to the second effective interpolation line detection circuit 251, and a line having a smallest level difference is detected in the effective interpolation line detection circuit 251. Moreover, in the effective interpolation line detection circuit 251, the case that the level difference 261 of the second line N is smaller than the level difference 260 of the first line M and the level difference 262 of the third line P is classified into the second pattern, and the case that the level difference 262 of the third line P is smaller than the level difference 260 of the first line M and the level difference 261 of the second line N is classified into the third pattern. Moreover, the case which is not the second pattern nor the third pattern is classified into the first pattern. Consequently, second effective interpolation line information 267 corresponding to a pattern is output to the effective interpolation line selection circuit 256.

The level differences 260, 263 and 264 of the first line M, fourth line Q and fifth line R are inputted to the third effective interpolation line detection circuit 252, and a line having a smallest level difference is detected. Subsequently, in the effective interpolation line detection circuit 252, the case that the level difference 264 of the fifth line R is smaller than the level difference 260 or the first line M and the level difference 263 of the fourth line Q is classified into the second pattern, and the case that the level difference 263 of the fourth line Q is smaller than the level difference 260 of the first line M and the level difference 264 of the fifth line R is classified into the third pattern. The case which is not the second pattern nor the third pattern is classified into the first pattern. Consequently, third effective interpolation line information 268 corresponding to a pattern is output from the effective interpolation line detection circuit 252 and is applied to the effective interpolation line selection circuit 256.

The level difference 260 of the first line M generated by the level difference generation circuit 250 is inputted to the level difference translation circuit 258 and is translated on the basis of a predetermined function. The translated level difference 269 of the first line M is applied to the third interpolation line setting circuit 253 and the fourth interpolation line setting circuit 254. In the third interpolation line setting circuit 253, the translated level difference 269 of the first line M is compared with the level difference 265 of the sixth line S, and when the level difference 265 of the sixth line S is smaller than the translated level difference 269, the sixth line S is set as the third interpolation line 270. Moreover, when the level difference 265 of the sixth line S is the converted level difference 269 or more, the first line M is set as the third interpolation line 270.

On the other hand, the translated level difference 269 of the first line M and the level difference 266 of the seventh line T are applied to the fourth interpolation line setting circuit 254. In the fourth interpolation line setting circuit 254, the translated level difference 269 is compared with the level difference 266 of the seventh line T. When the level difference 266 of the seventh line T is smaller than the translated level difference 269, the seventh line T is set as the fourth interpolation line 271, and when the level difference 266 of the seventh line T is the converted level difference 269 or more, the first line M is set as the fourth interpolation line 271. In the base pixel detection circuit 255 to which the input signal 259 is applied, the upper change level is compared with the lower change level, and base pixel information 272 is generated. The base pixel information 272 is applied to the effective interpolation line selection circuit 256.

In the effective interpolation line selection circuit 256, on the basis of the base pixel information 272 output from the base pixel detection circuit 255, one of the second effective interpolation line information 267 output from the second effective interpolation line detection circuit 251 and the third effective interpolation line information 268 output from the third effective interpolation line detection circuit 252 is selected. Selected effective interpolation line information is set as fourth effective interpolation line information 273. Moreover, in the second interpolation line selection and decision circuit 257, on the basis of the fourth effective interpolation line information 273 output from the effective interpolation line selection circuit 256, one of the third interpolation line 270 output from the third interpolation line setting circuit 253, the fourth interpolation line 271 output from the fourth interpolation line setting circuit 254 and the first line M inputted through a signal line 274 is selected. Consequently, a selected line is set as the ultimate interpolation line 275.

Namely, when the fourth effective interpolation line information 273 represents the second pattern, the third interpolation line 270 is set as the ultimate interpolation line 275 by the second interpolation line selection and decision circuit 257. When the fourth effective interpolation line information 273 represents the third pattern, the fourth interpolation line 271 is set as the ultimate interpolation line 275 by the second interpolation line selection and decision circuit 257. Furthermore, when the fourth effective interpolation line information 273 represents the first pattern, the first line M is set as the ultimate interpolation line 275 by the second interpolation line selection and decision circuit 257. The level difference generation circuit 250, the second and third effective interpolation line detection circuits 251 and 252, the base pixel detection circuit 255 and the effective interpolation line selection circuit 256 of the fourth interpolation line detection apparatus correspond to the level difference generation circuit 150, the second and third effective interpolation line detection circuits 151 and 152, the base pixel detection circuit 155 and the effective interpolation line selection circuit 156 in the third embodiment, respectively, and they have the same circuit configurations. Moreover, the third and fourth interpolation line setting circuits 253 and 254, the second interpolation line selection and decision circuit 257 and the level difference translation circuit 258 correspond to the third and fourth interpolation line setting circuits 98 and 99, the second interpolation line selection and decision circuit 100 and the level difference translation circuit 97, respectively, and they have the same circuit configurations.

As mentioned above, interpolation operation is carried out by using the pixels on the ultimate interpolation line obtained by the above-mentioned methods and apparatus of the embodiments, and thereby the image quality is improved.

In each embodiment described above, though the level difference of the first line M is translated by the level translation steps 82, 83, 245 and 246 (FIG. 9 and FIG. 22) and the level difference translation circuits 97 and 258 (FIG. 10 and FIG. 23), it is limited to the level difference of the first line M, and a similar effect is attained by translating the level difference of other line and comparing the level difference with the level difference of the first line M. Furthermore, after a translation coefficient is derived from the level difference of the first line M, even if the comparison is carried out by using the translation coefficient, a similar effect is attained. In the above-mentioned embodiments, the description is made by taking an example of monochromatic information. In color information, it is not preferable that the embodiments of the present invention are individually applied to a R-signal, a G-signal and a B-signal of a video signal. It is preferable that correlation is detected by using a level of the luminance signal or the G-signal, and the interpolation in the same direction is carried out with respect to the R-signal, G-signal and B-signal.

Latch circuit or flip-flop circuits are usable for the delay circuits, and thereby a synchronizing circuit synchronizing with a predetermined clock signal can be configured. Furthermore, the vertical delay circuit can be configured by a line memory or a buffer circuit. In the above-mentioned embodiments, the description is made by using a hardware configuration, but the embodiments of the present invention are realizable by using a software routine having substantially the same configuration as the hardware configuration. In the software routine, a CPU system is configured by a CPU (or DSP) for performing an order, a ROM for storing the order to the CPU and a table, a work-area of which the order is performed in the CPU, a RAM for a line buffer for three scanning lines which is used in the interpolation operation by the CPU and an I/O port for inputting a field video signal and outputting an interpolated frame video signal from the CPU.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An interpolation line detection method for detecting an ultimate interpolation line to interpolate an attentional pixel from plural lines passing through the attentional pixel on a scanning line to be interpolated, pixels on an upper scanning line placed over said scanning line to be interpolated and pixels on a lower scanning line placed under said scanning line to be interpolated characterized in that said interpolation line detection method comprises:
  a first effective interpolation line detection step,
  a first interpolation line setting step,
  a second interpolation line setting step and
  a setting method selection step,
and that
  by defining for the following steps that a level difference of a line passing through two pixels is a difference between a luminance level of a pixel and a luminance level of the other pixel,
  at said first effective interpolation line detection step, a level difference of a first line passing through an upper pixel on said upper scanning line placed just above said attentional pixel and a lower pixel on said lower scanning line placed just under said attentional pixel, a level difference of a second line passing through said upper pixel and a lower left pixel placed to the left of said lower pixel, a level difference of a third line passing through said upper pixel and a lower right pixel placed to the right of said lower pixel, a level difference of a fourth line passing through said lower pixel and an upper left pixel placed to the left of said upper pixel and a level difference of a fifth line passing through said lower pixel and an upper right pixel placed to the right of said upper pixel are compared with each other, a line having a smallest level difference is detected, and first effective interpolation line information is generated, at said first interpolation line setting step, said level difference of said first line is compared with a level difference of a sixth line passing through said upper right pixel and said lower left pixel, a line having a smallest level difference is detected and is set as a first interpolation line, at said second interpolation line setting step, said level difference of said first line is compared with a level difference of a seventh line passing through said upper left pixel and said lower right pixel, a line having a smallest level difference is detected and is set as a second interpolation line, and at said setting method selection step, one of prosecution of either said first interpolation line setting step or said second interpolation line setting step and employment of said first line as the ultimate interpolation line without prosecution of said interpolation line setting step is selected on the basis of said first effective interpolation line information.

2. An interpolation line detection method for detecting an ultimate interpolation line to interpolate an attentional pixel from plural lines passing through said attentional pixel on a scanning line to be interpolated, pixels on an upper scanning line placed over said scanning line to be interpolated and pixels on a lower scanning line placed under said scanning line to be interpolated characterized in that said interpolation line detection method comprises:

a first effective interpolation line detection step, a level difference translation step, a third interpolation line setting step, a fourth interpolation line setting step and a setting method selection step, and that by defining for the following steps that a level difference of a line passing through two pixels is a difference between a luminance level of a pixel and a luminance level of the other pixel, at said first effective interpolation line detection step, a level difference of a first line passing through an upper pixel on said upper scanning line placed just above said attentional pixel and a lower pixel on said lower scanning line placed just under said attentional pixel, a level difference of a second line passing through said upper pixel and a lower left pixel placed to the left of said lower pixel, a level difference of a third line passing through said upper pixel and a lower right pixel placed to the right of said lower pixel, a level difference of a fourth line passing through said lower pixel and an upper left pixel placed to the left of said upper pixel and a level difference of a fifth line passing through said lower pixel and an upper right pixel placed to the right of said upper pixel are compared with each other, a line having a smallest level difference is detected, and first effective interpolation line information is generated, at said level difference translation step, said level difference of said first line is translated on the basis of a predetermined function, at said third interpolation line setting step, a translated level difference of said first line is compared with a level difference of a sixth line passing through said upper right pixel and said lower left pixel, a line having a smallest level difference is detected and is set as a third interpolation line, at said fourth interpolation line setting step, a translated level difference of said first line is compared with a level difference of a seventh line passing through said upper left pixel and said lower right pixel, a line having a smallest level difference is detected and is set as a fourth interpolation line, and at said setting method selection step, one of prosecution of said third interpolation line setting step after prosecution at said level difference translation step, prosecution of said fourth interpolation line setting step after prosecution at said level difference translation step and employment of said first line as the ultimate interpolation line without prosecutions of said level difference translation step and said interpolation line setting step is selected on the basis of said first effective interpolation line information.

3. An interpolation line detection method in accordance with claim 2 characterized in that said predetermined function is a function of which in the case that said level difference of said first line is a predetermined threshold value and below, said level difference of said first line is translated to a lower value.

4. An interpolation line detection method for detecting an ultimate interpolation line to interpolate an attentional pixel from plural lines passing through said attentional pixel on a scanning line to be interpolated, pixels on an upper scanning line placed over said scanning line to be interpolated and pixels on a lower scanning line placed under said scanning line to be interpolated characterized in that said interpolation line detection method comprises:

a second effective interpolation line detection step, a third effective interpolation line detection step, a base pixel detection step, a detection method selection step, a first interpolation line setting step, a second interpolation line setting step and a setting method selection step, and that by defining for the following steps that a level difference of a line passing through two pixels is a difference between a luminance level of a pixel and a luminance level of the other pixel, at said second effective interpolation line detection step, a level difference of a first line passing through an upper pixel on an upper scanning line placed just above said attentional pixel and a lower pixel on a lower scanning line placed just under said attentional pixel, a level difference of a second line passing through said upper pixel and a lower left pixel placed to the left of said lower pixel and a level difference of a third line passing through said upper pixel and a lower right pixel placed to the right of said lower pixel are compared with each other, a line having a smallest level difference is detected, and second effective interpolation line information is generated, at said third effective interpolation line detection step, said level difference of said first line, said level difference of said fourth line passing through said lower pixel and an upper left pixel placed to the left of said upper pixel and a level difference of a fifth line passing through said lower pixel and an upper right pixel placed to the right of said upper pixel are compared with each other, a line having a smallest level difference is detected, and third effective interpolation line information is generated, at said base pixel detection step, an upper change level of the sum of a level difference between said upper pixel and a pixel placed to the left of said upper pixel with a predetermined interval and a level difference between said upper pixel and a pixel placed to the right of said upper pixel with a predetermined interval is compared with a lower change level of the sum of a level difference between said lower pixel and a pixel placed to the left of said lower pixel with a predetermined interval and a level difference between said lower pixel and a pixel placed to the right of said lower pixel with a predetermined interval, in the case that said upper change level is larger than said lower change level, base pixel information of which said upper pixel is a base pixel is output, and in the case that said lower change level is larger than said upper change level, base pixel information of which said lower pixel is the base pixel is output, at said detection method selection step, on the basis of said base pixel information, in the case that said upper pixel is the base pixel, said second effective interpolation line detection step is selected, and in the case that said lower pixel is the base pixel, said third effective interpolation line detection step is selected, at said first interpolation line setting step, said level difference of said first line is compared with a sixth line passing through said upper right pixel and said lower left pixel, a line having a smallest level difference is detected and is set as a first interpolation line, at said second interpolation line setting step, said level difference of said first line is compared with a level difference of a seventh line passing through said upper left pixel and said lower right pixel, a line having a smallest level difference is detected and is set as a second interpolation line, and at setting method selection step, one of prosecution of either said first interpolation line setting step or said second interpolation line setting step and employment of said first line as the ultimate interpolation line without prosecution of the interpolation line setting step is selected on the basis of said second effective interpolation line information or said third effective interpolation line information.

5. An interpolation line detection method for detecting an ultimate interpolation line to interpolate an attentional pixel from plural lines passing through an attentional pixel on a scanning line to be interpolated, pixels on an upper scanning line placed over said scanning line to be interpolated and pixels on a lower scanning line placed under said scanning line to be interpolated characterized in that said interpolation line detection method comprises:
a second effective interpolation line detection step,
a third effective interpolation line detection step,
a base pixel detection step,
a detection method selection step,
a level difference translation step, a third interpolation line setting step,
a fourth interpolation line setting step and a setting method selection step, and that by defining for the following steps that a level difference of a line passing through two pixels is a difference between a luminance level of a pixel and a luminance level of the other pixel, at said second effective interpolation line detection step, a level difference of a first line passing through an upper pixel on said upper scanning line placed just above of said attentional pixel and a lower pixel on said lower scanning line placed just under said attentional pixel, a level difference of a second line passing through said upper pixel and a lower left pixel placed to the left of said lower pixel and a level difference of a third line passing through said upper pixel and a lower right pixel placed to the right of said lower pixel are compared with each other, a line having a smallest level difference is detected and second effective interpolation line information is generated, at said third effective interpolation line detection step, said level difference of said first line M, a level difference of a fourth line passing through said lower pixel and an upper left pixel placed to the left of said upper pixel and a level difference of a fifth line passing through said lower pixel and an upper right pixel placed to the right of said upper pixel are compared with each other, a line having a smallest level difference is detected and third effective interpolation line information is generated, at said base pixel detection step, an upper change level of the sum of a level difference between said upper pixel and a pixel placed to the left of said upper pixel with a predetermined interval and a level difference between said upper pixel and a pixel placed to the right of said upper pixel with a predetermined interval is compared with a lower change level of the sum of a level difference between said lower pixel and a pixel placed to the left of said lower pixel with a predetermined interval and a level difference of said lower pixel and a pixel placed to the right of said lower pixel with a predetermined interval, in the case that said upper change level is larger than said lower change level, base pixel information of which said upper pixel is a base pixel is output, on the other hand, in the case that the lower change level is larger than said upper change level, base pixel information of which said lower pixel is said base pixel is output, at said detection method selection step, on the basis of said base pixel information, in the case that said upper pixel is said base pixel, said second effective interpolation line detection step is selected, and in the case that said lower pixel is said base pixel, said third effective interpolation line detection step is selected, at said level difference translation step, said level difference of said first line is translated on the basis of a predetermined function, at said third interpolation line setting step, a translated level difference of said first line is compared with a level difference of a sixth line passing through said upper right pixel and said lower left pixel, a line having a smallest level difference is detected and is set as a third interpolation line, at said fourth interpolation line setting step, the translated level difference of said first line is compared with a level difference of a seventh line passing through said upper left pixel and said lower right pixel, a line having a smallest level difference is detected and is set as a fourth interpolation line, and at said setting method selection step, one of prosecution of said third interpolation line setting step after prosecution at said level difference translation step, prosecution of said fourth interpolation line setting step after prosecution at said level difference translation step and employment of said first ling as the ultimate interpolation line without prosecutions of said level difference translation step and said interpolation line setting step is selected on the basis of said second effective interpolation line information or said third effective interpolation line information.

6. An interpolation line detection method in accordance with claim 4 characterized in that said predetermined function is a function of which in the case that said level difference of said first line is a predetermined threshold value and below, said level difference of said first line is translated to a lower value.

7. An interpolation line detection apparatus for detecting an ultimate interpolation line to interpolate an attentional pixel from plural lines passing through said attentional pixel on a scanning line to be interpolated, pixels on an upper scanning line placed over said scanning line to be interpolated and pixels on a lower scanning line placed under said scanning line to be interpolated characterized in that said interpolation line detection apparatus comprises:

level difference generation means, first effective interpolation line detection means, first interpolation line setting means, second interpolation line setting means and first interpolation line selection and decision means, and that by defining for the following steps that a level difference of a line passing through two pixels is a difference between a luminance level of a pixel and a luminance level of the other pixel, in said level difference generation means, a level difference of a first line passing through an upper pixel on said upper scanning line placed just above said attentional pixel and a lower pixel on said lower scanning line placed just under said attentional pixel, a level difference of a second line passing through said upper pixel and a lower left pixel placed to the left of said lower pixel, a level difference of a third line passing through said upper pixel and a lower right pixel placed to the right of said lower pixel, a level difference of a fourth line passing through said lower pixel and an upper left pixel placed to the left of said upper pixel, a level difference of a fifth line passing through said lower pixel and an upper right pixel placed to the right of said upper pixel, a level difference of a sixth line passing through said upper right pixel and said lower left pixel and a level difference of a seventh line passing through said upper left pixel and said lower right pixel are generated, in said first effective interpolation line detection means, said level differences of said first line, said second line, said third line, said fourth line and said fifth line are compared with each other, a line having a smallest level difference is detected, and first effective interpolation line information is generated, in said first interpolation line setting means, said level difference of said first line (M) is compared with said level difference of said sixth line, a line having a smallest level difference is detected and is set as a first interpolation line, in said second interpolation line setting means, said level difference of said first line is compared with said level difference of said seventh line, a line having a smallest level difference is detected and is set as a second interpolation line, and in said first interpolation line selection and decision means, on the basis of said first effective interpolation line information, the ultimate interpolation line is selected and decided from said first interpolation line, said second interpolation line and said first line.

8. An interpolation line detection apparatus in accordance with claim 7 characterized in that in said first effective interpolation line detection means, in said level differences of said first line, said second line, said third line, said fourth line and said fifth line output from said level difference generation means, in the case that said level difference of said second line or said fifth line is smaller than other level differences, said first effective interpolation line information is classified into a second pattern, in the case that said level difference of said third line or said fourth line is smaller than other level differences, said first effective interpolation line information is classified into a third pattern, and in the case which is not said second pattern nor said third pattern, said first effective interpolation line information is classified into a first pattern, and in said first interpolation line selection and decision means, in the case that said first effective interpolation line information is said first pattern, said first line is selected, in the case of said second pattern, said first interpolation line is selected, and in the case of said third pattern, said second interpolation line is selected, and a selected line is decided to the ultimate interpolation line.

9. An interpolation line detection apparatus for detecting an ultimate interpolation line to interpolate an attentional pixel from plural lines passing through said attentional pixel on a scanning line to be interpolated, pixels on an upper scanning line placed over said scanning line to be interpolated and pixels on a lower scanning line placed under said scanning line to be interpolated characterized in that said interpolation line detection apparatus comprises:

level difference generation means, first effective interpolation line detection means, level difference translation means, third interpolation line setting means, fourth interpolation line setting means and second interpolation line selection and decision means, and that by defining for the following steps that a level difference of a line passing through two pixels is a difference between a luminance level of a pixel and a luminance level of the other pixel, in said level difference generation means, a level difference of a first line passing through an upper pixel on said upper scanning line placed just above said attentional pixel and a lower pixel on said lower scanning line placed just under said attentional pixel, a level difference of a second line passing through said upper pixel and a lower left pixel placed to the left of said lower pixel, a level difference of a third line passing through said upper pixel and a lower right pixel placed to the right of said lower pixel, a level difference of a fourth line passing through said lower pixel and an upper left pixel placed to the left of said upper pixel, a level difference of a fifth line passing through said lower pixel and an upper right pixel placed to the right of said upper pixel, a level difference of a sixth line passing through said upper right pixel and said lower left pixel and a level difference of a seventh line passing through said upper left pixel and lower right pixel are generated, in said first effective interpolation line detection means, said level differences of said first line, said second line, said third line, said fourth line and said fifth line are compared with each other, a line having a smallest level difference is detected, and first effective interpolation line information is generated, in said level difference translation means, said level difference of said first line is translated on the basis of a predetermined function, in said third interpolation line setting means, a translated level difference of said first line is compared with said level difference of said sixth line, a line having a smallest level difference is detected and is set as a third interpolation line, in said fourth interpolation line setting means, a translated level difference of said first line is compared with said level difference of said seventh line, a line having a smallest level difference is detected and is set as a fourth interpolation line, and in said second interpolation line selection and decision means, on the basis of said first effective interpolation line information, the ultimate interpolation line is selected and decided from said third interpolation line, said fourth interpolation line and said first line.

10. An interpolation line detection apparatus in accordance with claim 9 characterized in that in said first effective interpolation line detection means, in said level differences of said first line, said second line, said third line, said fourth line and said fifth line output from said level difference generation means, in the case that the level difference of said second line or the level difference of said fifth line is smaller than other level differences, said first effective interpolation line information is classified into a second pattern, in the case that the level difference of said third line or the level difference of said fourth line is smaller than other level differences, said first effective interpolation line information is classified into a third pattern, and in the case which is not said second pattern nor said third pattern, said first effective interpolation line information is classified into a first pattern, and in said second interpolation line selection and decision means, in the case that said first effective interpolation line information is said first pattern, said first line is selected, in the case of said second pattern, said third interpolation line is selected, and in the case of said third pattern, said fourth interpolation line is selected, and a selected line is decided to the ultimate interpolation line.

11. An interpolation line detection apparatus in accordance with claim 9 characterized in that said predetermined function is a function of which in the case that said level difference of said first line is a predetermined threshold value and below, said level difference of said first line is translated to a lower value.

12. An interpolation line detection apparatus for detecting an ultimate interpolation line to interpolate an attentional pixel from plural lines passing through said attentional pixel on a scanning line to be interpolated, pixels on an upper scanning line placed over said scanning line to be interpolated and pixels on a lower scanning line placed under said scanning line to be interpolated characterized in that said interpolation line detection apparatus comprises:
level difference generation means,
second effective interpolation line detection means,
third effective interpolation line detection means,
first interpolation line setting means,
second interpolation line setting means,
base pixel detection means,
effective interpolation line selection means and
first interpolation line selection and decision means,
and that by defining for the following steps that a level difference of a line passing through two pixels is a difference between a luminance level of a pixel and a luminance level of the other pixel, in said level difference generation means, a level difference of a first line passing through an upper pixel on said upper scanning line placed just above said attentional pixel and a lower pixel on said lower scanning line placed just under said attentional pixel, a level difference of a second line passing through said upper pixel and a lower left pixel placed to the left of said lower pixel, a level difference of a third line passing through said upper pixel and a lower right pixel placed to the right of said lower pixel, a level difference of a fourth line passing through said lower pixel and an upper left pixel placed to the left of said upper pixel, a level difference of a fifth line passing through said lower pixel and an upper right pixel placed to the right of said upper pixel, a level difference of a sixth line passing through said upper right pixel and said lower left pixel and a level difference of a seventh line passing through said upper left pixel and said lower right pixel are generated, in said second effective interpolation line detection means, said level differences of said first line, said second line and said third line are compared with each other, a line having a smallest level difference is detected, and second effective interpolation line information is generated, in said third effective interpolation line detection means, said level differences of said first line, said fourth line and said fifth line are compared with each other, a line having a smallest level difference is detected, and third effective interpolation line information is generated, in said first interpolation line setting means, said level difference of said first line is compared with said level difference of said sixth line, a line having a smallest level difference is detected and is set as a first interpolation line, in said second interpolation line setting means, said level difference of said first line is compared with said level difference of said seventh line, a line having a smallest level difference is detected and is set as a second interpolation line, in said base pixel detection means, an upper change level representing a magnitude of a level change between pixels on said upper scanning line placed above said attentional pixel is compared with a lower change level representing a magnitude of a level change between pixels on said lower scanning line placed under said attentional pixel, in the case that said upper change level is larger than said lower change level, base pixel information of which said upper pixel is a base pixel is output, on the other hand, in the case that said lower change level is larger than said upper change level, base pixel information of which said lower pixel is the base pixel is output, in said effective interpolation line selection means, on the basis of said base pixel information, one of said second effective interpolation line information and said third effective interpolation line information is selected, and in said first interpolation line selection and decision means, on the basis of said second effective interpolation line information or said third effective interpolation line information selected by said effective interpolation line selection means, the ultimate interpolation line is selected and decided from said first interpolation line, said second interpolation line and said first line.

13. An interpolation line detection apparatus in accordance with claim 12 characterized in that in said second effective interpolation detection means, in the level differences of said first line, said second line and said third line output from said level difference generation means, in the case that said level difference of said second line is smaller than other level differences, said second effective interpolation line information is classified into a second pattern, in the case that said level difference of said third line is smaller than other level differences, said second effective interpolation line information is classified into a third pattern, and in the case which is not said second pattern nor said third pattern, said second effective interpolation line information is classified into a first pattern, in said third effective interpolation line detections means, in the level differences of said first line, said fourth line and said fifth line output from said level difference generation means, in the case that said level difference of said fifth line is smaller than other level differences, said third effective interpolation line information is classified into said second pattern, in the case that said level difference of said fourth line is smaller than other level differences, said third effective interpolation line information is classified into said third pattern, and in the case which is not said second pattern nor said third pattern, said third effective interpolation line information is classified into said first pattern, and in said first interpolation line selection and decision means, in the case that said second effective interpolation line information or said third effective interpolation line information represents said first pattern, said first line is selected, in the case of said second pattern, said first interpolation line is selected, and in the case of said third pattern, said second interpolation line is selected, and a selected line is decided to the ultimate interpolation line.

14. An interpolation line detection apparatus in accordance with claim 12 characterized in that said base pixel detection means comprises an upper change level detection means for detecting a level change of a pixel on said upper scanning line, a lower change level detection means for detecting a level change of a pixel on said lower scanning line, and change level comparison means for comparing an upper change level output from said upper change level detection means with a lower change level output from said lower change level detection means.

15. An interpolation line detection apparatus in accordance with claim 14 characterized in that in said upper change level detection means, the sum of a level difference between said upper pixel and a pixel placed to the left of said upper pixel with a predetermined interval and a level difference between said upper pixel and a pixel placed to the right of said upper pixel with a predetermined interval is derived, in said lower change level detection means, the sum of a level change between said lower pixel and a pixel placed to the left of said lower pixel with a predetermined interval and a level difference between said lower pixel and a pixel placed to the right of said lower pixel with a predetermined interval is derived, and in said change level comparison means, said upper change level output from said upper change level detection means is compared with said lower change level output from said lower change level detection means, and in the case that said upper change level is larger than said lower change level, said upper pixel is set as said base pixel, on the other hand, in the case that said lower change level is larger than said upper change level, said lower pixel is set as said base pixel.

16. An interpolation line detection apparatus for detecting an ultimate interpolation line to interpolate an attentional pixel from plural lines passing through an attentional pixel on a scanning line to be interpolated, pixels on an upper scanning line placed over said scanning line to be interpolated and pixels on a lower scanning line placed under said scanning line to be interpolated characterized in that said interpolation line detection apparatus comprises:

level difference generation means, second effective interpolation line detection means, third effective interpolation line detection means, level difference translation means, third interpolation line setting means, fourth interpolation line setting means, base pixel detection means, effective interpolation line selection means, and second interpolation line selection and decision means, and that by defining for the following steps that a level difference of a line passing through two pixels is a difference between a luminance level of a pixel and a luminance level of the other pixel, in said level difference generation means, a level difference of a first line passing through an upper pixel on said upper scanning line placed just above said attentional pixel and a lower pixel on said lower scanning line placed just under said attentional pixel, a level difference of a second line passing through said upper pixel and a lower left pixel placed to the left of said lower pixel and a level difference of a third line passing through said upper pixel and a lower right pixel placed to the right of said lower pixel, a level difference of a fourth line passing through said lower pixel and an upper left pixel placed to the left of said upper pixel, a level difference of a fifth line passing through said lower pixel and an upper right pixel placed to the right of said upper pixel, a level difference of a sixth line passing through said upper right pixel and said lower left pixel, and a level difference of a seventh line passing through said upper left pixel and said lower right pixel are generated, in said second effective interpolation line detection means, said level differences of said first line, said second line and said third line are compared with each other, a line having a smallest level difference is detected, and second effective interpolation line information is generated, in said third effective interpolation line detection means, said level differences of said first line, said fourth line and said fifth line are compared with each other, a line having a smallest level difference is detected, and third effective interpolation line information is generated, in said level difference translation means, said level difference of said first line is translated on the basis of a predetermined function, in said third interpolation line setting means, a translated level difference of said first line is compared with said level difference of said sixth line, a line having a smallest level difference is detected and is set as a third interpolation line, in said fourth interpolation line setting means, a translated level difference of said first line is compared with said level difference of said seventh line, a line having a smallest level difference is detected and is set as a fourth interpolation line, in said base pixel detection means, an upper change level representing a magnitude of a level change between pixels on said upper scanning line placed above said attentional pixel is compared with a lower change level representing a magnitude of a level change between pixels on said lower scanning line placed under said attentional pixel, in the case that said upper change level is larger than said lower change level, base pixel information of which said upper pixel is a base pixel is output, on the other hand, in the case that said lower change level is larger than said upper change level, base pixel information of which said lower pixel is said base pixel is output, in said effective interpolation line selection means, on the basis of said base pixel information, one of said second effective interpolation line information and said third effective interpolation line information is selected, and in second interpolation line selection and decision means, on the basis of said second effective interpolation line information or said third effective interpolation line information selected by said effective interpolation line selection means, the ultimate interpolation line is selected and decided from said third interpolation line, said fourth interpolation line and said first line.

17. An interpolation line detection apparatus in accordance with claim 16 characterized in that in said second effective interpolation line detection means, in said level differences of said first line, said second line and said third line output from said level difference generation means, in the case that said level difference of said second line is smaller than other level differences, said second effective interpolation line information is classified into a second pattern, in the case that said level difference of said third line is smaller than other level differences, said second effective interpolation line information is classified into a third pattern, and in the case which is not said second pattern nor said third pattern, said second effective interpolation line information is classified into a first pattern, in said third effective interpolation line detection means, in said level differences of said first line, said fourth line and said fifth line output from said level difference generation means, in the case that said level difference of said fifth line is smaller than other level differences, said third effective interpolation line information is classified into said second pattern, in the case that said level difference of said fourth line is smaller than other level differences, said third effective interpolation line information is classified into said third pattern, and in the case which is not said second pattern nor said third pattern, said third effective interpolation line information is classified into said first pattern, and in said second interpolation line selection and decision means, in the case that said second effective interpolation line information or said third effective interpolation line information is said first pattern, said first line is selected, in the case of said second pattern, said third interpolation line is selected, and in the case of said third pattern, said fourth interpolation line is selected, and a selected line is decided to said ultimate interpolation line.

18. An interpolation line detection apparatus in accordance with claim 16 characterized in that said predetermined function is a function of which in the case that said level difference of said first line is a predetermined threshold value and below, said level difference of said first line is translated to a lower value.

19. An interpolation line detection apparatus in accordance with claim 16 characterized in that said base pixel detection means comprises an upper change level detection means for detecting a level change of a pixel on said upper scanning line, a lower change level detection means for detecting a level change of a pixel on said lower scanning line, and change level comparison means for comparing an upper change level output from said upper change level detection means with a lower change level output from said lower change level detection means.

* * * * *